US005248558A

United States Patent [19]

Bagchi et al.

[11] Patent Number: 5,248,558

[45] Date of Patent: * Sep. 28, 1993

[54] CASE-HARDENED GELATIN-GRAFTED POLYMER PARTICLES

[75] Inventors: Pranab Bagchi, Webster; William L. Gardner, Fairport, both of N.Y.

[73] Assignee: Eastman Kodak Company, Rochester, N.Y.

[*] Notice: The portion of the term of this patent subsequent to Aug. 8, 2006 has been disclaimed.

[21] Appl. No.: 718,489

[22] Filed: Jun. 20, 1991

Related U.S. Application Data

[63] Continuation-in-part of Ser. No. 497,472, Mar. 22, 1990, Pat. No. 5,026,632.

[51] Int. Cl.[5] ........ B32B 5/16

[52] U.S. Cl. ........ 428/407; 428/402.24; 428/403; 430/138; 430/537; 430/539; 430/642

[58] Field of Search ........ 428/403, 407, 402.24; 430/138, 537, 539, 642

[56] References Cited

U.S. PATENT DOCUMENTS

| | | | |
|---|---|---|---|
| T969,005 | 4/1978 | Tanaka et al. | 430/546 |
| 3,507,661 | 4/1970 | Ofstead | 430/628 |
| 3,576,628 | 4/1971 | Beavers | 430/244 |
| 3,844,816 | 10/1974 | Vassiliades et al. | 428/407 |
| 4,115,474 | 9/1978 | Vassiliades et al. | 524/22 |
| 4,499,179 | 2/1985 | Ota et al. | 430/523 |
| 4,822,727 | 4/1989 | Ishigaki et al. | 430/536 |
| 4,840,881 | 6/1989 | Watanabe et al. | 430/512 |
| 4,855,219 | 8/1989 | Bagchi et al. | 430/496 |
| 4,920,004 | 4/1990 | Bağchi | 428/407 |
| 5,026,632 | 6/1991 | Bagchi et al. | 430/545 |
| 5,066,572 | 11/1991 | O'Connor et al. | 430/503 |

FOREIGN PATENT DOCUMENTS

| | | |
|---|---|---|
| 0307855 | 3/1989 | European Pat. Off. . |
| 0307856 | 3/1989 | European Pat. Off. . |
| 2078992 | 1/1982 | United Kingdom . |

OTHER PUBLICATIONS

Curme et al., J. Phys. Chem., 1964, pp. 3009–3016.
Dautrick et al., J. Photogr. Sci., 1973, pp. 221–226.
Farnell et al., J. Photogr. Sci., 1982, pp. 109–117.

*Primary Examiner*—Paul J. Thibodeau
*Assistant Examiner*—D. S. Nakarani
*Attorney, Agent, or Firm*—Paul A. Leipold

[57] ABSTRACT

It has been shown by Photon Correlation Spectroscopy than when additional hardener is added to below saturation gel-grafted polymer particles, the gel layer shrinks due to hardening, as there is no free gel left in solution. In films, such case-hardened gelatin-grafted soft polymer particles can act as highly elastic stress absorbing fillers. This is because the dry case-hardened shell is expected to form a thin hard shell around the soft polymer particles. It is shown that gelatin-grafted soft polymer particles and case-hardened gelatin-grafted soft polymer particles, incorporated in the emulsion layers of pressure sensitive photographic products, produce coatings with highly reduced pressure sensitivity without any developability or delamination concerns. In this invention the case-hardened gelatin-grafted polymer particles are preferred over the simple gelatin-grafted material. The core polymer particle can have diameters anywhere between 10 to $10^8$ nm with a monolayer of gelatin shell that is chemically bonded to its surface and the gelatin shell is further cross-linked with each other to hydrated thicknesses of between 5 to 20 nm.

14 Claims, 8 Drawing Sheets

CASE-HARDENED GELATIN-GRAFTED POLYMER PARTICLES

CROSS REFERENCE TO RELATED APPLICATION

This is a continuation-in-part of our earlier filed application Ser. No. 497,472 filed on Mar. 22, 1990, now U.S. Pat. No. 5,026,632.

TECHNICAL FIELD

This invention relates to the use of polymer particles coated in the same layer with the silver halide photographic emulsion of a photographic product, to reduce effects of pressure on the sensitivity of photographic film products.

BACKGROUND ART

The following publications may be considered related technology to this invention:

R-1: T. H. James, "The Theory of the Photographic Processes," 4th Edition, MacMillan (1977).

R-2: R. Doubendiek et al, "Multicolor Photographic Element With a Tabular Grain Emulsion Layer Overlaying a Minus Blue Recording Emulsion Layer," U.S. Pat. No. 4,693,964 issued to Eastman Kodak Company on Sep. 15, 1987.

R-3: Anonymous, "Photographic Silver Halide Emulsions, Preparations, Addenda, Processing and Systems," *Research Disclosure,* 308, p. 933-1015 (1989).

R-4: D. J. Beavers, "Photographic Diffusion Transfer Process, "U.S. Pat. No. 3,576,628 issued to Eastman Kodak Company on Apr. 27, 1971.

R-5: Ishigaki et al, "Silver Halide Photographic Light Sensitive Material," U.S. Pat. No. 4,822,727 issued to Fuji Photo Film Co., Ltd., on Apr. 18, 1989.

R-6: Y. Watanabe et al, "Process for the Production of Light-Sensitive Silver Halide Photographic Material, " U.S. Pat. No. 4,840,881 issued to Konishiroku Photo Industry Co., Ltd. on Jun. 20, 1989.

R-7: A. Tanaka et al, "Color Photographic Materials Containing High-Boiling Organic Solvent," U.S. Defensive Publication T969,005 issued on Apr. 4,1978.

R-8: H. Ota et al, "Silver Halide Photographic Light-Sensitive Material," U.S. Pat. No. 4,499,179 issued to Konishiroku Photo Industry Co., Ltd. on Feb. 12, 1985.

R-9: P. Bagchi et al, "Photographic Element Having Polymer Particles Covalently Bonded to Gelatin," U.S. Pat. No. 4,855,219 issued to Eastman Kodak Company on Aug. 8, 1989.

R-10: P. Bagchi et al, "Photographic Element Having Polymer Particles Covalently Bonded to Gelatin," European Patent Application 0 307 856, priority data Sep. 18, 1987, corresponding to R-9.

R-11: P. Bagchi, "Gelatin-Grafted Polymer Particles," U.S. Application Ser. No. 307,393 allowed Dec., 1989.

R-12: P. Bagchi, "Gelatin-Grafted Polymer Particles," European patent Application 0 037 855, priority date Sep. 18, 1987 corresponding to R-11.

R-13: P. Bagchi, "Theory of Stabilization of Colloidal Particles by Nonionic Polymers," *J. Colloid and Interface Science*, 47, 86 (1974).

R-14: P. Bagchi, "Nonionic Denting and Mixing Potentials Between Two Flat Plates," *J. Colloid and Interface Science*, 47, 100 (1974).

R-15: D. S. Gibbs et al, "Structured Particle-Latexes," U.S. Pat. No. 4,017,442 issued to the Dow Chemical Company on Apr. 12, 1977.

R-16: G. A. Campbell, "Crosslinkable Polymers Having Vinylsulfone Groups or Styrylsulfonyl Groups and Their Use as Hardeners for Gelatin," U.S. Pat. No. 4,161,407 issued to Eastman Kodak Company on Jul. 17, 1979.

R-17: M. Oganer et al, "Element for Electrophonics," U.S. Pat. No. 4,548,870 issued to Fuji Photo Film Co., Ltd., on Oct. 22, 1985.

R-18: H.L. Cohen et al, "Polymeric Mordants and Elements Containing Same," U.S. Pat. No. 3,625,694 issued to Eastman Kodak Company on Dec. 7, 1971.

R-19: L. M. Minsk et al, "Polymeric Hardeners Containing Aziridinyl Units on the Side Chain," U.S. Pat. No. 3,671,256 issued to Eastman Kodak Company on Jun. 20, 1972.

R-20: H. Jung et al, "Process for the Chain-Lengthening of Gelatin by Partial Hardening," U.S. Pat. No. 4,421,847 issued to Agfa-Gevaert on Dec. 20, 1983.

R-21: J. Herzog, "Diphenyl-harnstoffchlorid als Reagens Für Phenole," *Chem. Ber.* 40, 1831 (1907).

R-22: W. Himmelman, "Hardening With a Heterocyclic Carbamoyl Ammonium Compound of a Photographic Material Containing a Silver Halide Layer," U.S. Pat. No. 3,880,665 issued to Agfa-Gevaert on Apr. 29, 1975, and German Application 2,225,230 dated May 24, 1972.

R-23: W. Himmelman, "Hardening With a Heterocyclic Carbamoyl Ammonium Compound of a Photographic Material Containing a Silver Halide Layer," U.S. Pat. No. 3,880,665 issued to Agfa-Gevaert on Apr. 29, 1975, and German Application 2,317,677 dated Apr. 7, 1973.

R-24: W. Himmelman et al, "Process for Hardening Silver Halide Containing Photographic Layer With Sulpho or Sulphoalkyl-Substituted Carbomoyl Peridinium Compounds," U.S. Pat. No. 4,063,952 issued to Agfa-Gevaert on Dec. 20, 1977, and German Application 2,439,551 dated Aug. 17, 1974.

R-25: P. J. Stang et al, "Dication Ether Salts $R^{+}—O—R^{+}—2CF_3SO_3^{-}$, from the Reaction of Trifluoro-methane Sulfonic Anhydride With Activated Ketones," *J. Am. Chem. Soc.*, 103, 4837 (1981).

R-26: D. S. Morehouse et al, "Expandable Thermoplastic Polymer Particles Containing Volatile Fluid Foaming Agent and Method of Foaming the Same," U.S. Pat. No. 3,615,972 issued to the Dow Chemical Company on Oct. 26, 1971.

R-27: W. R. Sorenson et al, "*Preparative Methods of Polymer Chemistry,*" 2nd Edition, Wiley (1968), N.Y.

R-28: M. P. Stevens, "*Polymer Chemistry—An Introduction,*" Addison Wesley (1975), London.

R-29: H. G. Curme et al, "The Adsorption of Gelatin to a Silver Bromide Sol," *J. Phys. Chem.* 68, 3009 (1964).

Pressure applied to photographic emulsion coatings can produce both reversible and irreversible effects on the sensitometry of the photographic product. Sufficient pressure can cause irreversible distortion of the emulsion grains or cause the formation of physical defects that alter the sensitivity for latent image formation. It has been generally recognized (R-1) that effect of pressure on the sensitivity of photographic products increases with the magnitude of the applied pressure.

Various types of pressure effects on silver halide photographic systems have been known for long periods of time. In general, pressure sensitivity can be described as an effect which causes the photographic sensitometry of film products to change after the application of some kind of a mechanical stress to a coated photographic film.

The cited prior art (R-1) describe various mechanisms in association with the various types of pressure sensitivities observed with photographic products. However, one observation in all of the described cases, is clear that the change in sensitometry is caused by the transmission of physical stress to the silver halide crystals.

In photographic systems, pressure sensitivity, as described, in this general term produces considerable quality defects of products that manifest as increased or decreased density marks on them after development. Such stress may be received from transport mechanism in cameras or other exposing devices or possibly during processing operations. In general, the pressure sensitivity problem increases with the physical size of the emulsion crystals. Its manifestation is most severe in the high aspect ratio highly deformable "Tabular Grain Emulsions," extensively described in prior art (R-1, R-2, and R-3). There is, therefore, a need to produce photographic coatings that are less sensitive to mechanical stress in order to improve the quality of many of the current photographic products.

Dry gelatin is hard and can thus easily transmit applied stress to the silver halide crystals in a coated photographic system. Prior arts (R-4 and R-5) describe the inclusion of low glass transition temperature, Tg, soft polymer latexes into coated photographic films. (R-4) discloses inclusion of such polymers into the emulsion containing layers, and (R-5) describes incorporation of such polymers into overcoat layers. Inclusion of polymers as described in (R-4 and R-5) does tend to reduce pressure sensitivity of photographic film products. Present day photographic products have higher and higher photographic speeds and consequently are larger and larger in dimension and exhibit more severe pressure sensitivity problems. In order to reduce the pressure sensitivities of present day silver halide photographic products, the amounts of soft latex load necessary as described in prior art (R-4 and R-5) are so large that such films with high polymer latex loads suffer from severe developability problems due to the coalescence of the soft polymer particles in the dry coated layers, where a large portion of the gelatin has been replaced by soft polymer latexes. Similarly, prior art (R-6, R-7, and R-8) describe the use of organic solvent dispersions in photographic layer to reduce the pressure sensitivities of film products. however, in order to reduce the pressure sensitivity of present day high speed and high pressure sensitivity photographic products, the solvent loads of the films have to be so high that such films show signs of delamination in the layers containing the solvent dispersion when pressure is applied for testing. Therefore, it would be desirable to reduce pressure sensitivity of photographic products without inhibiting developability or diminishing the integrity of film product.

DISCLOSURE OF INVENTION

An object of this invention is to provide articles with improved resistance to defects caused by pressure on the film.

Another object is to provide improved photographic film.

A further object is to provide a method of forming particles that will improve the pressure resistant properties of film.

These and other objects of the invention are generally accomplished by providing a soft polymer particle that is covalently bonded to gelatin either directly or with the aid of a cross-linking agent. This material in a preferred form of the invention is then provided with a further quantity of hardener that provides a hardened coating on the surface of the gelatin bonded particle herein referred to as a case-hardened particle. The hardened coating of the shell is preferably up to 10 nm in thickness. These particles when added to the photosensitive silver halide grain containing layers of a photographic element result in a photographic element having improved resistance to defects caused by pressure being applied to the film either before or after imaging but prior to development.

The method comprises forming a dispersion of the soft particle in water, incorporating a gelatin grafting agent into said polymer particle by addition to the dispersion and adding gelatin solution to said latex particle dispersion to form a gelatin-grafted case-hardened particle.

A BRIEF DESCRIPTION OF THE DRAWINGS

FIG. 1 shows a submicroscopic view of the circular section of a hardened coated layer of gel-grafter polymer particles.

FIG. 2 pictorially shows the process of case-hardening.

Figures 7A, 7B, 7C:
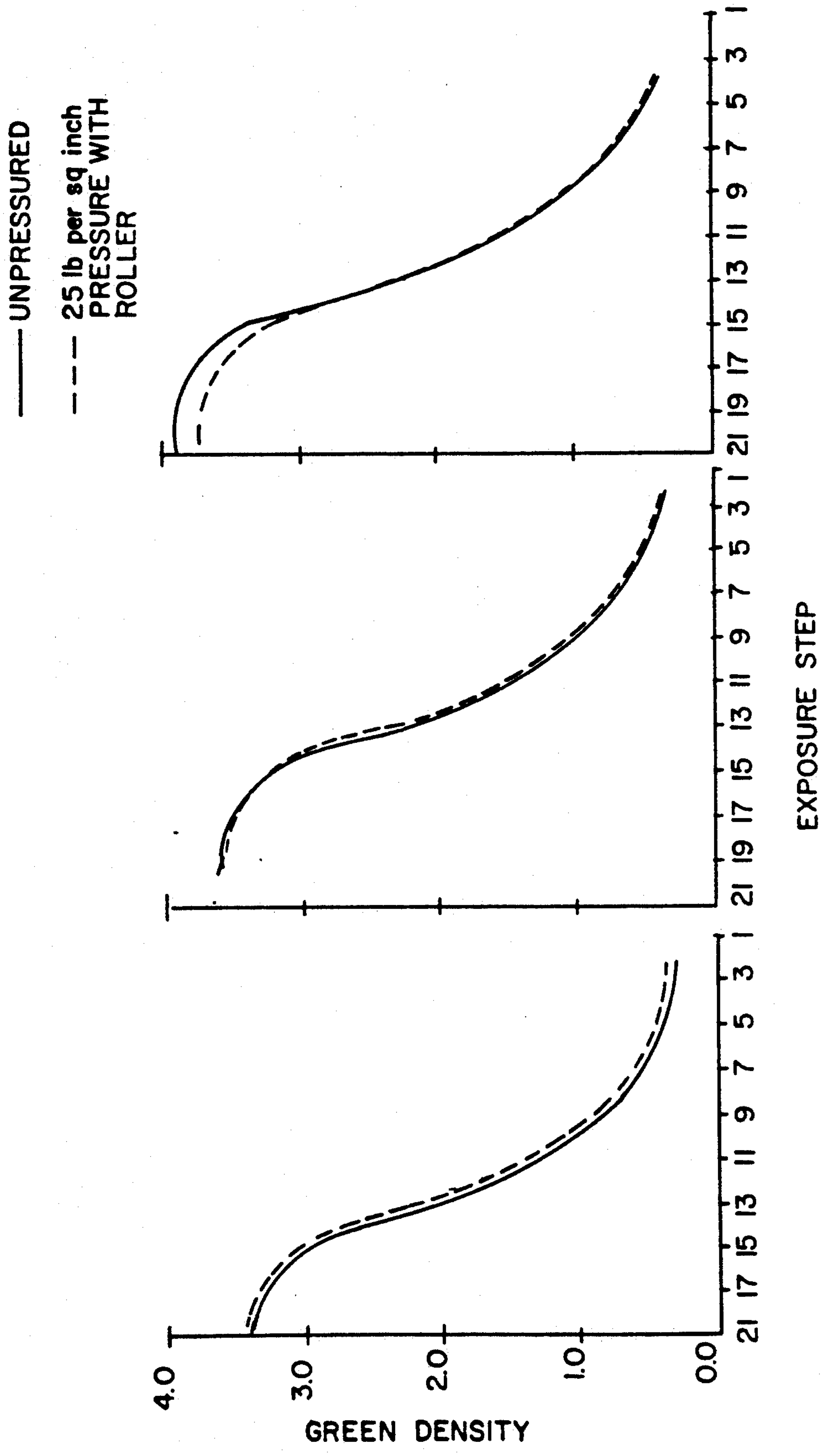
FIG. 7 shows sensitometric curves for pressured (25 lbs/sq. inch, dashed lines) and unpressured (continuous lines) magenta Kodachrome monochrome coating a—Control, Example-21 b—Invention, gel-g-Latex Particle D, Example-22 c—Invention, Case-Hardened gel-g-Latex Particle-D, Example-13.
Figures 8A, 8B, 8C:
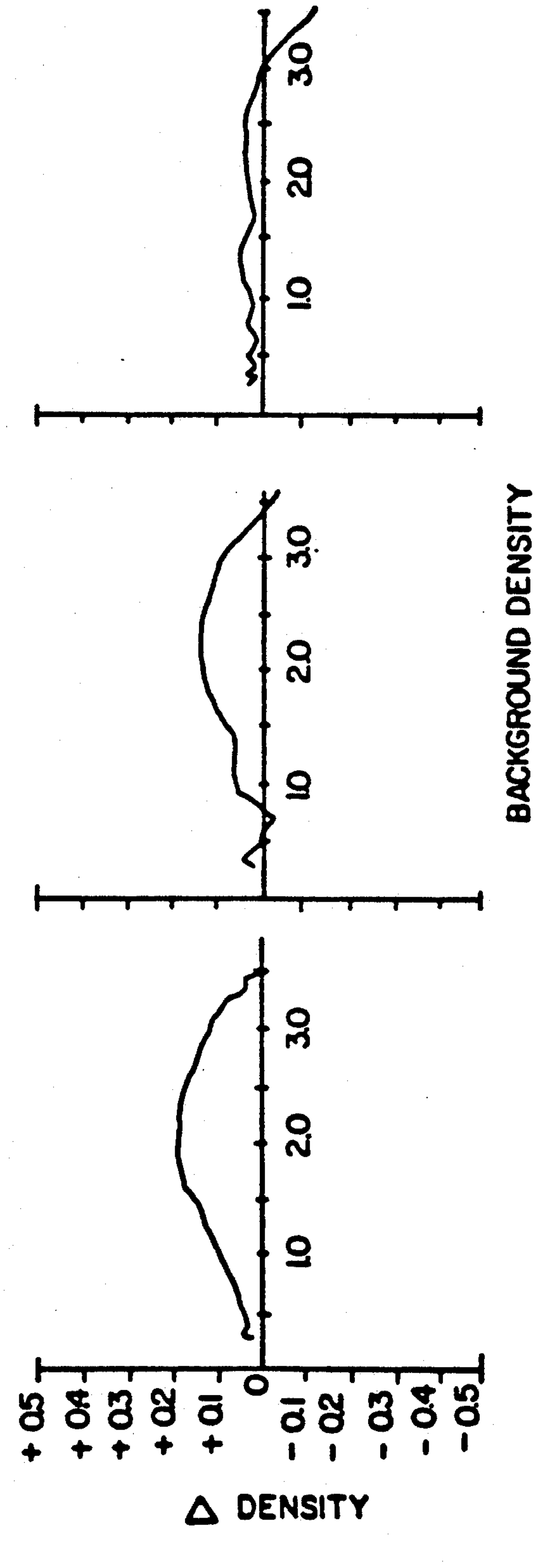

FIG. 8 shows change in density vs background density plots for demonstration of pressure sensitivity (a, b and c same as in FIG. 7)

Figure 9:
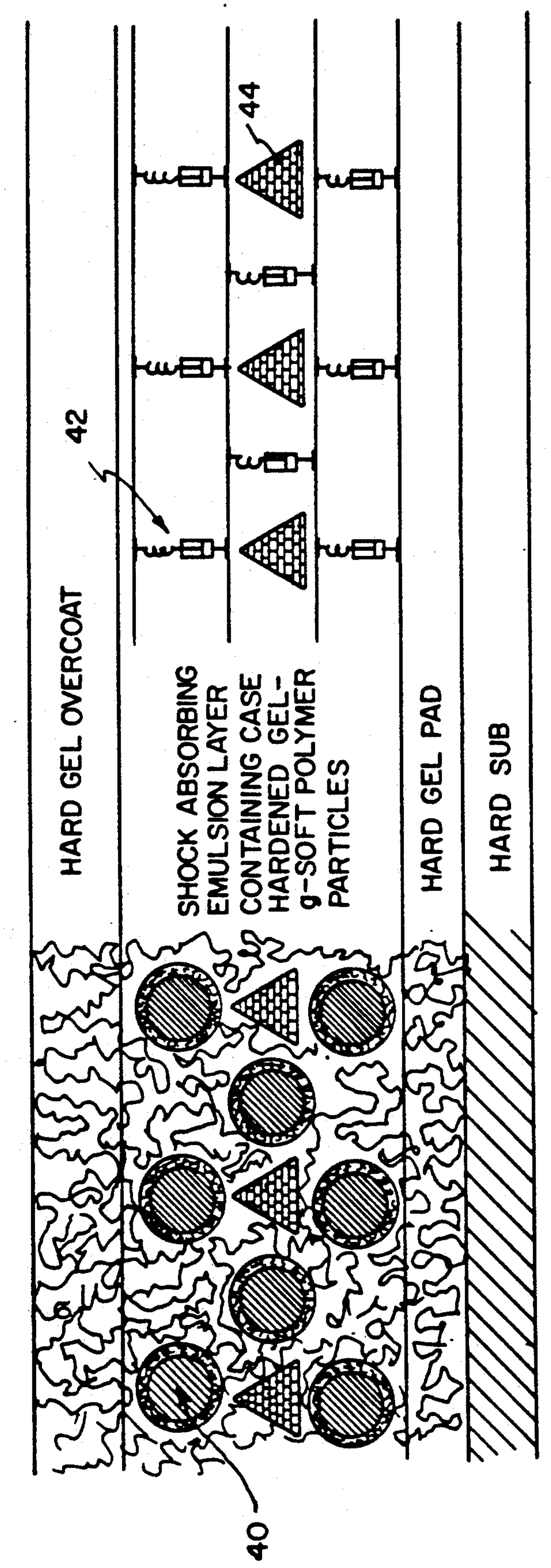

FIG. 9 Model for pressure sensitivity relief by the method of this invention.

MODES FOR CARRYING OUT THE INVENTION

The invention has numerous advantages over prior processes for minimization of pressure sensitivity. The photographic layers having the particles of the invention incorporated therein do not have a tendency to delaminate as high solvent containing pressure resistant materials. Further the particles of the invention do not lead to substantial deterioration in photographic properties. Another advantage is that the particles do not contribute environmentally undesirable materials that will come out during development. These and other advantages will be apparent from the detailed description below.

The polymer particles useful in the invention include particles that are covalently bonded to gelatin either directly or with the aid of a grafting agent. The polymers are soft and deformable and preferably have a glass transition temperature of less than 25° C. Suitable materials are those polymer latex particles as described in U.S. Pat. No. 4,855,219—Bagchi et al (R-9), European Patent Application EP 0,307,856—Bagchi et al., (R-10) and European Patent Application EP 0,307,855—Bagchi et al. (R-12) incorporated herein by reference. The particles therein when hardened as in the preferred form of the invention provide significantly improved pressure resistance.

These materials can be made with just enough gelatin to cover the surface of the latex particles with very little or no gel left in solution. A preferred ratio of gelatin to the soft polymer particles is between 1 to 2 and 2 to 1. When to such material is added further quantity of hardener, the hardener crosslinks the gelatin adsorption layer, as there is no free gelatin left in solution. This process may be called case-hardening. Such case-hardened gelatin-grafted soft latex particles are soft latex cores covered with a highly cross-linked hard thin skin around the core to form particles. In this composite particle, the hard shell, of up to 10 nm in thickness, is highly elastic and the core is soft and highly viscous. A dried coating containing these particles will exhibit viscoelastic behavior which means that it will absorb stress by deforming. However, this hardened elastic skin will relax back once stress is released, or in simple words, such composite material will both absorb and resist mechanical stress (as the shock absorbers in an automobile) and will prevent substantial physical stress from being transmitted to the silver halide grains and thus produce relief from pressure sensitivity. The polymer particles have a chemically bonded layer of gelatin around them that sterically stabilizes the particles and thus will prevent coalescence as may happen when high levels of soft polymer particles (without bonded gelatin shells around them) are incorporated in a photographic coating. Additional hardener added in process of making the particles will cross-link the chemically bonded gelatin shell around the particles. This gelatin layer surrounding the particles will thus further cross-link with each other or with gelatin in a coating forming a stress absorbent layer in combination with silver halide crystals. The silver halide element may contain conventional color coupler dispersions prepared with or without coupler solvents. The invention also is suitable for use in films where the coupler is added with the developing solutions.

DESCRIPTION OF GELATIN-GRAFTED SOFT POLYMER PARTICLES

Polymer particles useful in the present invention are those that contain recurring units that are capable of covalently bonding with gelatin directly or with the aid of an activator or a grafting aid.

Monomers from which polymers can be derived that are capable of directly bonding with gelatin through the amine group of gelatin are as follows:

1. Suitable activated halogen-containing monomers include monomers having appended halomethylaryl, halomethylcarbonyl, halomethylsulfonyl, haloethylcarbonyl, and haloethylsulfonyl groups which will, after polymerization, also undergo crosslinking with a suitable crosslinking agent such as a diamine, dithiol, diol, and so forth.

Monomers having halomethylaryl groups, for example, vinylbenzyl chloride, and vinylbenzyl bromide, are disclosed in U.S. Pat. No. 4,017,442 (R-15).

Useful monomers having appended haloethylsulfonyl groups such as m- and p-(2-chloroethylsulfonylmethyl)styrene and N-(4-chloroethylsulfonylmethylphenyl)acrylamide are described in U.S. Pat. Nos. 4,161,407 (R-16) and 4,548,870 (R-17).

Polymers having appended halomethylcarbonyl or haloethylcarbonyl groups such as chloroacetyl and chloropropionyl, are described in U.S. Pat. No. 3,625,694. Monomers which provide such crosslinkable groups include: vinyl chloroacetate, N-(3-chloroacetamidopropyl)methacrylamide, 2-chloroacetamidoethyl methacrylate, 4-chloroacetamidostyrene, m- and p-chloracetamidomethylstyrene, N-(3-chloroacetamidocarbonyliminopropyl)methacrylamide, 2-chloroacetamidocarbonyliminoethyl methacrylate, 4-chloroacetamidocarbonyliminostyrene, m- and p-chloroacetamidocarbonyliminomethylstyrene, N-vinyl-N'-(3-chloropropionyl)urea, 4-(3-chloropropionamido)styrene, 4-(3-chloropropionamidocarbonylimino)styrene, 2-(3-chloropropionamido)ethyl methacrylate, and N-[2-(3-chloropropionamido)ethyl]-methacrylamide.

2. Another variety of useful active halogen monomer includes those having appended triazinyl groups such as N-[3-(3,5-dichloro-1-triazinylamino)-propyl]methacrylamide.

3. Active ester group-containing monomers are disclosed in U.S. Pat. No. 4,548,870 (R-17). Preferred active ester monomers are N-[2-(ethoxycarbonylmethoxycarbonyl)ethyl]acrylamide, N-(3-methacrylamidopropionyloxy)succinimide, N-(acryloyloxy)succinimide, and N-(methacryloyloxy)succinimide.

4. Polymers having appended aldehyde groups as cross-linkable sites are also disclosed in U.S. Pat. No. 3,625,694 (R-18). Monomers providing such groups are p-methacryloyloxybenzaldehyde, vinylbenzaldehyde and acrolein.

5. Monomers having appended aziridine groups such as N-acryloylaziridine, N-(N-vinylcarbamyl)aziridine, and 2-(1-aziridinyl)ethyl acrylate, as described in U.S. Pat. No. 3,671,256 (R-19).

6. Monomers having appended isocyanates (e.g., isocyanatoethyl acrylate, isocyanatoethyl methacrylate, or $\alpha,\alpha$-dimethylmetaisopropenylbenzyl isocyanate).

Monomers, the polymers, and copolymers of which are capable of covalently bonding with gelatin through the use of a grafting agent, include carboxylic acids (e.g., acrylic acid, methacrylic acid, itaconic acid, and maleic acid or anhydride), amine-containing monomers (e.g., 2-aminoethyl methacrylate and N-(3-aminopropyl)methacrylamide hydrochloride), and active methylene group-containing monomers (e.g., 2-acetoacetoxyethyl methacrylate and diacetone acrylamide).

Gelatin grafting agents that can be utilized for the attachment of gelatin to polymer particles having carboxyl groups are as follows:

(1) Carbamoylonium salts are used for covalent attachment of the reactive amine- or sulfhydryl-containing compound (gelatin) to the polymeric particles having carbonyl groups in the practice of this invention. These salts are described in some detail in U.S. Pat. No.

4,421,847 (R-20) (issued Dec. 20, 1983 to Jung et al), and are generally represented by the structure:

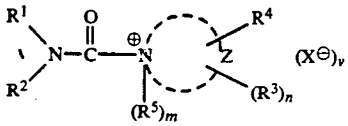

(I)

In structure (I), Z represents the atoms necessary to complete a substituted or unsubstituted 5- or 6-membered heterocyclic aromatic ring including heterocyclic rings having a fused carbocyclic ring (for example, a pyridinium, imidazolium, thiazolium, isoxazolium or quinolinium ring). Preferably, Z represents the atoms necessary to complete a substituted 6-membered heterocyclic aromatic ring.

Further, m and n are independently 0 or 1.

$R^1$ and $R^2$ are, independently of each other, substituted or unsubstituted alkyl (generally of 1 to 6 carbon atoms, for example, methyl, ethyl, isopropyl, or chloromethyl) or substituted or unsubstituted aryl (generally of 6 to 10 carbon atoms, for example, phenyl, p-methylphenyl, m-chlorophenyl, or naphthyl), or substituted or unsubstituted aralkyl (generally of 7 to 12 carbon atoms, for example, benzyl or phenethyl which can be substituted in the same manner as the aryl group).

Alternatively, $R^1$ and $R^2$ together represent the atoms necessary to complete a piperidine, piperazine, or morpholine ring, which ring can be substituted, for example, with one or more alkyl groups each having 1 to 3 carbon atoms or by a halo atom.

$R_3$ is a hydrogen atom, a substituted or unsubstituted alkyl as defined above for $R^1$, or the group $$-[A]-$$

wherein A represents the polymerized vinyl backbone of a homo- or copolymer formed from one or more ethylenically unsaturated polymerizable compounds such that the molecular weight of the homo- or copolymer is greater than about 1000. Useful ethylenically unsaturated polymerizable, compounds are known to one of ordinary skill in the polymer chemistry art. The polymer [A] can comprise additional moieties derived from the compounds represented by structure (I).

$R^4$ is a hydrogen atom, a substituted or unsubstituted alkyl (as defined above for $R^1$), or when Z represents the atoms necessary to complete a pyridinium ring and n is 0, $R^4$ is selected from the following groups:

(a) $-NR^6-CO-R^7$ wherein $R^6$ is hydrogen or substituted or unsubstituted alkyl (generally of 1 to 4 carbon atoms, for example, methyl, ethyl, n-butyl, chloromethyl, $R^7$ is hydrogen, substituted or unsubstituted alkyl (as defined above for $R^6$) or $-NR^8R^9$ wherein $R^8$ and $R^9$ are, independently of each other, hydrogen or substituted or unsubstituted alkyl (as defined above for $R^6$.

(b) $-(CH_2)_q-NR^{10}R^{11}$ wherein $R^{10}$ is $-CO-R^{12}$, $R^{11}$ is hydrogen or substituted or unsubstituted alkyl (as defined above for $R^6$), $R^{12}$ is hydrogen, substituted or unsubstituted alkyl (as defined above for $R^6$) or $-NR^{13}R^{14}$ wherein $R^{13}$ is substituted or unsubstituted alkyl (as defined above for $R^6$) or substituted or unsubstituted aryl (as defined above for $R^1$), $R^{14}$ is hydrogen, substituted or unsubstituted alkyl (as defined above for $R^6$) or substituted or unsubstituted aryl (as defined for $R^1$), and q is an integer from 1 to 3, (c) $-(CH_2)_r-CONR^{15}R^{16}$ wherein $R^{15}$ is hydrogen, substituted or unsubstituted alkyl (as defined above for $R^6$) or substituted or unsubstituted aryl (as defined above for $R^1$), $R^{16}$ is hydrogen or substituted or unsubstituted alkyl (as defined above for $R^6$), or $R^{15}$ and $R^{16}$ together represent the atoms necessary to complete a 5- or 6-membered aliphatic ring, and r is 0 or an integer from 1 to 3, (d)

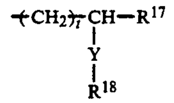

wherein $R^{17}$ is hydrogen, substituted or unsubstituted alkyl (as defined above for $R^6$), Y is oxy or $-NR^{19}-$, $R^{18}$ is hydrogen, substituted or unsubstituted alkyl (as defined above for $R^6$), $-CO-R^{20}$, or $-CO-NHR^{21}$ wherein $R^{19}$, $R^{20}$, and $R^{21}$ are, independently of each other, hydrogen or substituted or unsubstituted alkyl (as defined above for $R^6$), and t is 2 or 3, and (e) $-R^{21}X'^{\ominus}$ wherein $R^{21}$ is substituted or unsubstituted alkylene of from 1 to 6 carbon atoms (for example, methylene, trimethylene or isopropylene), and $X'^{\ominus}$ is a covalently bonded anionic group such as sulfonate or carboxylate so as to form an inner salt group with the pyridinium nucleus.

$R^5$ is substituted or unsubstituted alkyl (as defined above for $R^6$), substituted or unsubstituted aryl (as defined above for $R^1$) or substituted or unsubstituted aralkyl (as defined above for $R^1$), provided that m is 0 when the nitrogen atom to which $R^5$ is bound is attached to the remainder of the ring through a double bond.

$X^{\ominus}$ is an anion, such as a halide, tetrafluoroborate, nitrate, sulfate, p-toluenesulfonate, perchlorate, methosulfate or hydroxide, and v is 0 or 1, provided that it is 0 only when $R^4$ is $-R^{21}X'^{\ominus}$.

Preferably, the carbamoylonium compound used in the practice of this invention is represented by the structure above wherein $R^1$ and $R^2$ together represent the atoms necessary to complete a morpholine ring, Z represents the atoms necessary to complete a pyridinium ring, $R^4$ is $-R^{21}X'^{\ominus}$ (such as $-CH_2CH_2SO_3^-$, and m, n, and v are each 0.

Representative preferred carbamoylonium compounds include 1-(4-morpholinocarbonyl)-4-(2-sulfoethyl)pyridinium hydroxide, inner salt, and 1-(4-morpholinocarbonyl)pyridinium chloride, most preferably, 1-(4-morpholinocarbonyl)-4-(2-sulfoethyl)pyridinium hydroxide, inner salt.

The carbamoylonium compounds useful in the practice of this invention can be obtained commercially, or prepared using known procedures and starting materials, such as described in U.S. Pat. No. 4,421,847 (noted above) (R-20), and references noted therein, incorporated herein by reference. Some examples of such compounds are listed in Table I.

TABLE I
Carbamoylonium Gelatin-Grafting Agents
| | Carbamoylonium Compound Number |
|---|---|
| 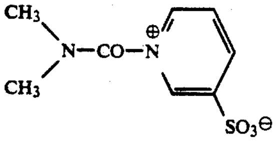 | 1 |
| 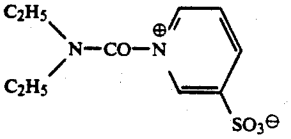 | 2 |
| 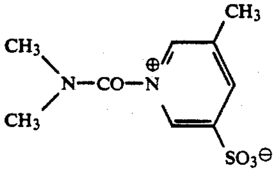 | 3 |
| 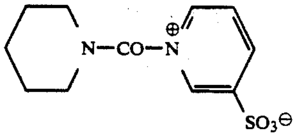 | 4 |
| 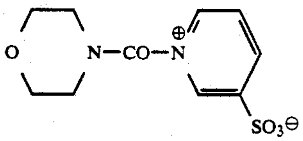 | 5 |
| 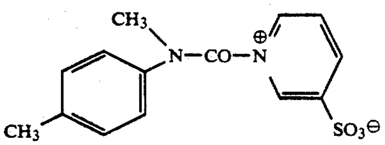 | 6 |
| 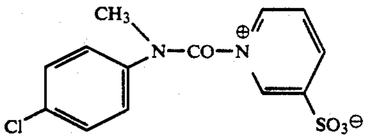 | 7 |
| 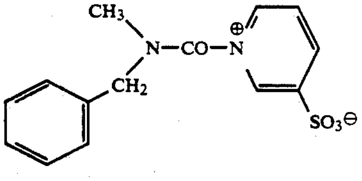 | 8 |
| 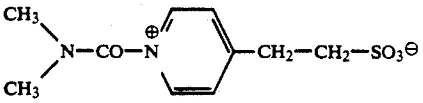 | 9 |
| 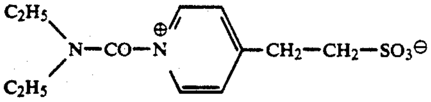 | 10 |

TABLE I-continued
| Carbamoylonium Gelatin-Grafting Agents | Carbamoylonium Compound Number |
|---|---|
| 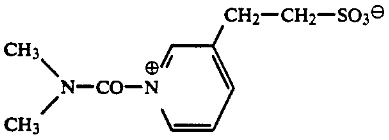 | 11 |
| 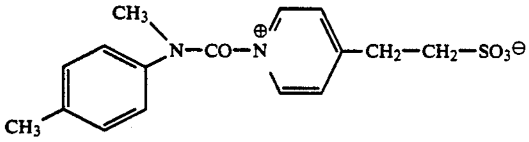 | 12 |
| 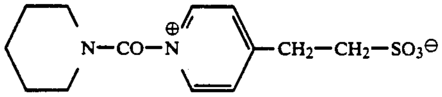 | 13 |
| 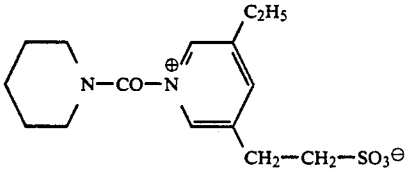 | 14 |
| 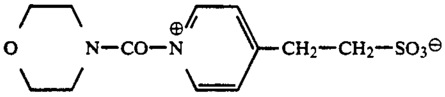 | 15 |
| 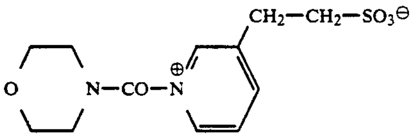 | 16 |
| 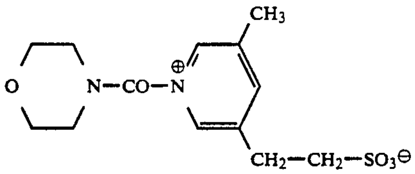 | 17 |
| 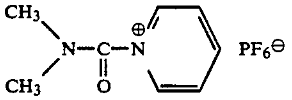 | 18 |
| 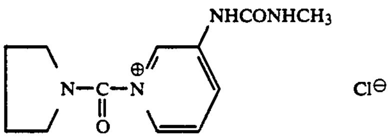 | 19 |
| 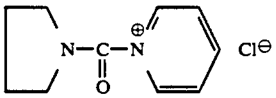 | 20 |

TABLE I-continued

Carbamoylonium Gelatin-Grafting Agents

| | Carbamoylonium Compound Number |
|---|---|
| 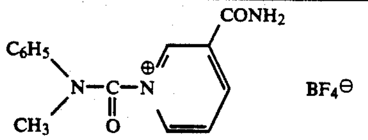 | 21 |
| 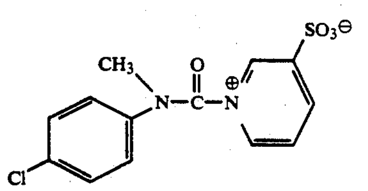 | 22 |
| 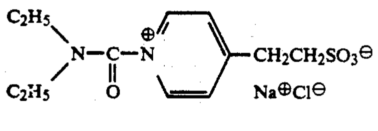 | 23 |
| 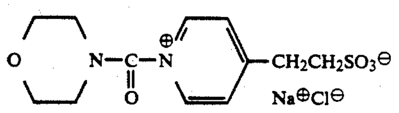 | 24 |
| 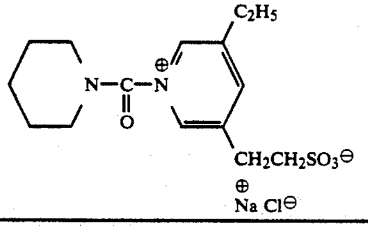 | 25 |

The above compounds can be synthesized readily by literature methods. Carbamic acid chlorides are synthesized from secondary amines with, for example, phosgene, and are then reacted in the dark with aromatic heterocyclic nitrogen-containing compounds. The synthesis of compound 3 has been described in Chem. Ber., 40, p. 1831 (1907) (R-21). Other synthetic methods can be found in the German patent applications 2,225,230 (R-22); 2,317,677 (R-23); and 2,439,551 (R-24).

(2) Dication ethers are also useful as grafting agents for bonding gelatin to a polymer particle containing carboxyl groups.

Useful dication ethers have the formula:

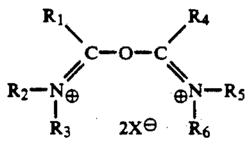

(II)

In this formula, $R_1$ represents hydrogen, alkyl, aralkyl, aryl, alkenyl, $-YR_7$, the group

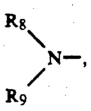

, or the group

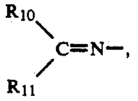

, with Y representing sulfur or oxygen, and $R_7$, $R_8$, $R_9$, $R_{10}$, and $R_{11}$ each independently representing alkyl, alkyl, aralkyl, aryl, or alkenyl. Alternatively, $R_8$ and $R_9$, or $R_{10}$ and $R_{11}$ may together form a ring structure. $R_{10}$ and $R_{11}$ may each also represent hydrogen. Also, $R_1$ together with $R_2$ may form a heterocyclic ring.

$R_2$ and $R_3$ each independently represents alkyl, aralkyl, aryl, or alkenyl, or, combined with $R_1$ or each other, forms a heterocyclic ring.

$R_4$, $R_5$, and $R_6$ are independently defined as are $R_1$, $R_2$, and $R_3$, respectively, and can be the same as or different from $R_1$, $R_2$, and $R_3$.

$X^{\ominus}$ represents an anion or an anionic portion of the compound to form an intramolecular (inner) salt.

Dication ethers of formula (II) are described in further detail below.

Preferably, $R_1$ is hydrogen, alkyl of 1 to 20 carbon atoms (e.g., methyl, ethyl, butyl, 2-ethylhexyl, or dodecyl), aralkyl of from 7 to 20 carbon atoms (e.g., benzyl, phenethyl), aryl of from 6 to 20 carbon atoms (e.g., phenyl, naphthyl), alkenyl of from 2 to 20 carbon atoms (e.g., vinyl, propenyl), the group

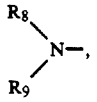

, or the group

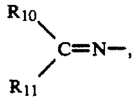

, $R_1$ can combine with $R_2$ or $R_3$ to form a heterocyclic ring of 5 to 8 atoms. This ring contains the nitrogen atom to which $R_2$ and $R_3$ are attached in formula (II) and may contain an additional nitrogen atom, or an oxygen or sulfur atom. Examples of such rings include pyridine, quinoline, isoquinoline, thiazole, benzothiazole, thiazoline, oxazole, benzoxazole, imidazole, benzimidazole, and oxazoline.

$R_7$, $R_8$, $R_9$, $R_{10}$, and $R_{11}$ are preferably alkyl of 1 to 20 carbon atoms (e.g., methyl, ethyl, butyl, 2-ethylhexyl, or dodecyl), aralkyl of from 7 to 20 carbon atoms (e.g., benzyl, phenethyl), aryl of from 6 to 20 carbon atoms (e.g., phenyl, naphthyl), or alkenyl of from 2 to 20 carbon atoms (e.g., vinyl, propenyl).

$R_8$ and $R_9$, or $R_{10}$ and $R_{11}$ can also combine to form a ring structure of 5 to 8 atoms. The $R_8$-$R_9$ ring contains the nitrogen atom to which $R_8$ and $R_9$ are attached, and may also contain an additional nitrogen atom, or an oxygen or sulfur atom. The $R_{10}$-$R_{11}$ ring may also contain one or more nitrogen atoms, an oxygen atom, a sulfur atom, or any combination thereof. Examples of such rings include pyrrolidine, piperidine, and morpholine. Preferably, $R_2$ and $R_3$ may each be alkyl of 1 to 20 carbon atoms (e.g., methyl, ethyl, butyl, 2-ethylhexyl, or dodecyl), aralkyl of from 7 to 20 carbon atoms (e.g., benzyl, phenethyl), aryl of from 6 to 20 carbon atoms (e.g., phenyl, naphthyl), or alkenyl of from 2 to 20 carbon atoms (e.g., vinyl, propenyl). $R_2$ and $R_3$ also preferably combine with each other to form a heterocyclic ring of 5 to 8 atoms. This ring contains the nitrogen atom to which $R_2$ and $R_3$ are attached, and may also contain an additional nitrogen atom, or an oxygen or sulfur atom. Examples of such rings include pyrrolidine, piperidine, and morpholine. Either of $R_2$ or $R_3$ can combine with $R_1$ to form a heterocyclic ring, as described above in reference to $R_1$.

$X^{\ominus}$ may be any anion that forms a salt compound according to formula (II) that is useful to form biological and diagnostic reagents according to the invention. Preferred anions include a sulfonate ion such as methylsulfonate or p-toluenesulfonate, $CF_3SO_3^{\ominus}$, $BF_4^{\ominus}$, $PF_6^{\ominus}$, and $ClO_4^{\ominus}$.

In addition to the above-described alkyl, aralkyl, aryl, alkenyl, and heterocyclic groups, groups also useful as $R_1$, $R_2$, $R_3$, $R_4$, $R_5$, $R_6$, $R_7$, and $R_8$ include substituted alkyl, aralkyl, aryl, alkenyl, and heterocyclic groups. Useful substituents include halogen, alkoxy of from 1 to 20 carbon atoms, aryloxy of from 6 to 20 carbon atoms, a sulfo group, N,N-disubstituted carbamoyl, N,N-disubstituted sulfamoyl, and other groups known to those skilled in the art that do not prevent the compounds from functioning as reactive intermediates according to the invention.

Examples of compounds of formula (II) are shown below in Table II.

TABLE II

| Dication Ether Gelatin-Grafting Agents | Dication Ether Number |
|---|---|
| 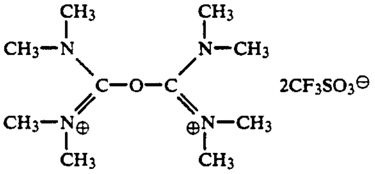 | 1 |
| 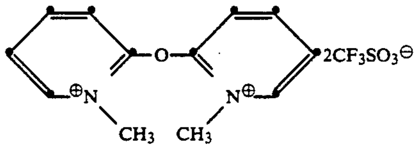 | 2 |
| 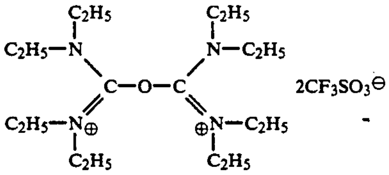 | 3 |
| 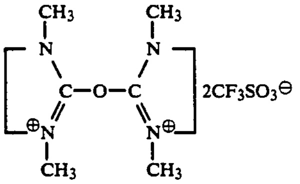 | 4 |
| 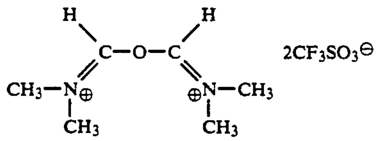 | 5 |

TABLE II-continued
| Dication Ether Gelatin-Grafting Agents | Dication Ether Number |
|---|---|
| 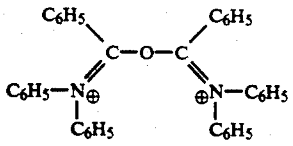 $2BF_4^{\ominus}$ | 6 |
| 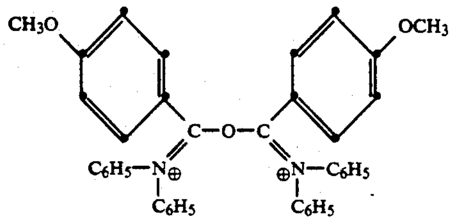 $2PF_6^{\ominus}$ | 7 |
| 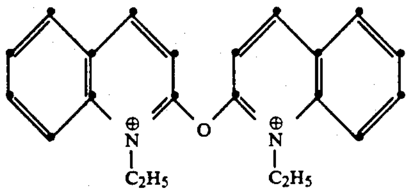 $2CH_3SO_3^{\ominus}$ | 8 |
| 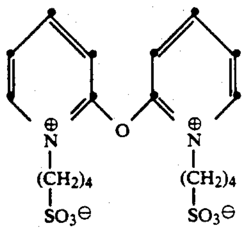 | 9 |
| 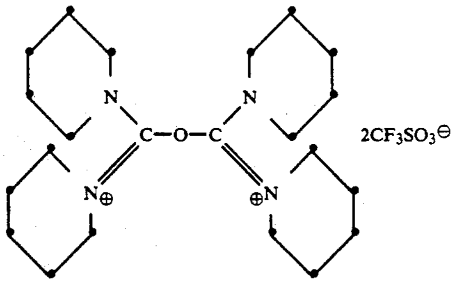 $2CF_3SO_3^{\ominus}$ | 10 |
| 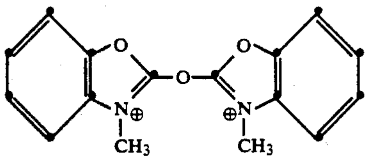 $2CF_3SO_3^{\ominus}$ | 11 |
| 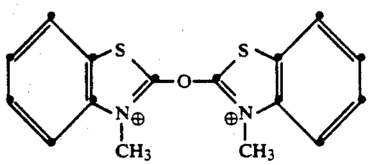 $2CF_3SO_3^{\ominus}$ | 12 |

TABLE II-continued
| Dication Ether Gelatin-Grafting Agents | Dication Ether Number |
|---|---|
| 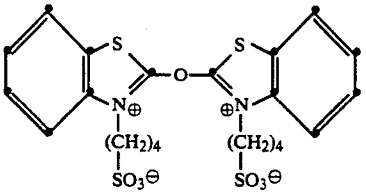 | 13 |
| 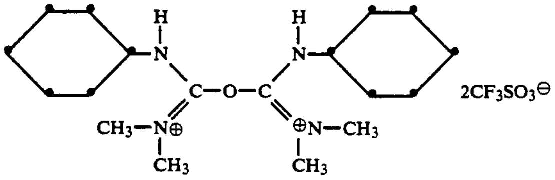 | 14 |
| 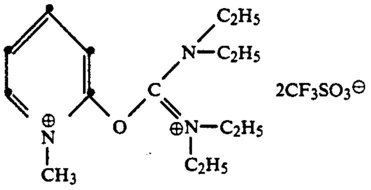 | 15 |
| 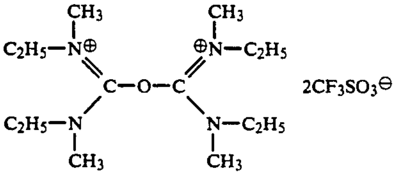 | 16 |
| 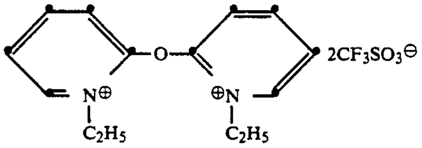 | 17 |
| 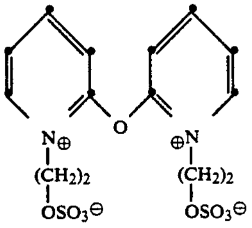 | 18 |
| 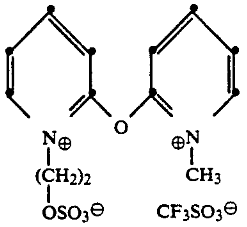 | 19 |

TABLE II-continued
Dication Ether Gelatin-Grafting Agents
| | Dication Ether Number |
|---|---|
| 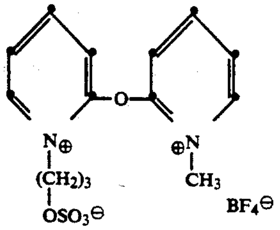 | 20 |
| 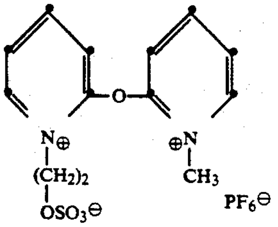 | 21 |
| 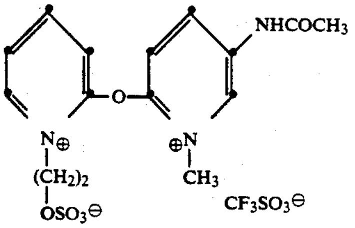 | 22 |
| 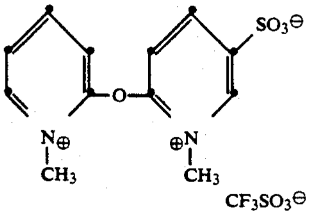 | 23 |
| 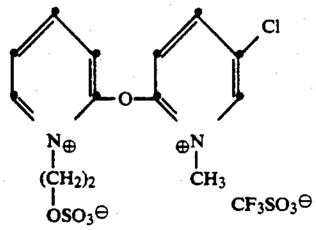 | 24 |
| 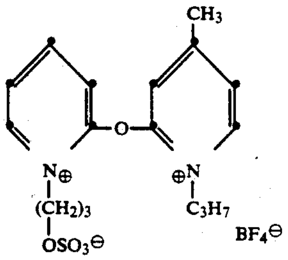 | 25 |

TABLE II-continued
Dication Ether Gelatin-Grafting Agents
| | Dication Ether Number |
|---|---|
| 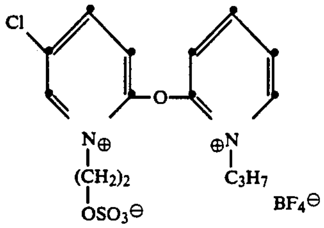 | 26 |
| 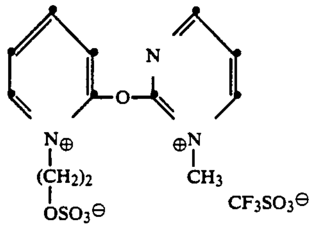 | 27 |
| 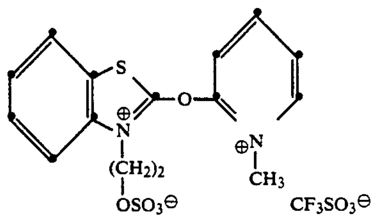 | 28 |
| 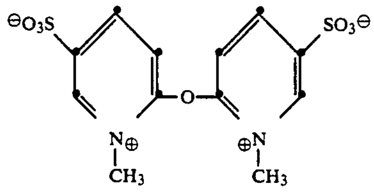 | 29 |
| 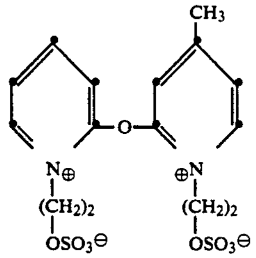 | 30 |
| 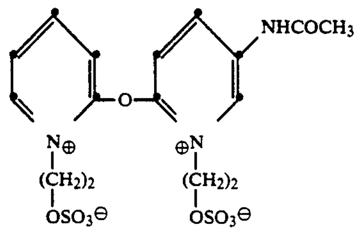 | 31 |

TABLE II-continued

| Dication Ether Gelatin-Grafting Agents | Dication Ether Number |
|---|---|
| 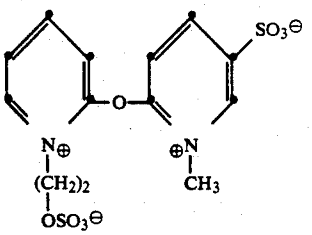 | 32 |
| 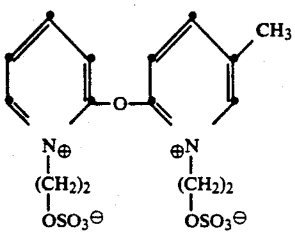 | 33 |
| 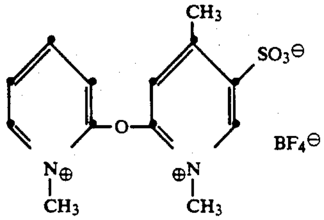 | 34 |
| 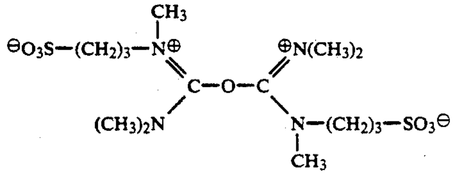 | 35 |
| 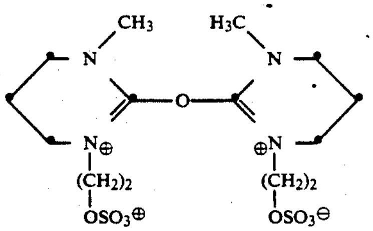 | 36 |
| 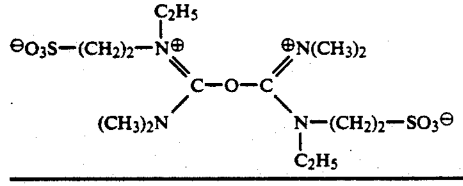 | 37 |

The ethers of formula (II) can be made by techniques known to those skilled in the chemical synthesis art. Useful synthesis techniques include those described in *Journal of American Chemical Society*, 103, 4839 (1981) (R-25).

(3) Carbodiimides can also be used to attach gelatin to carboxylated latex particles.

Particularly preferred carbodiimide coupling agents are water-soluble carbodiimides of the formula:

$$R_{12}—N{=}C{=}N—R_{13}$$

wherein each of $R_{12}$ or $R_{13}$ is selected from: cycloalkyl having from 5 to 6 carbon atoms in the ring; alkyl of from 1 to 12 carbon atoms e.g., methyl, ethyl, n-propyl, isopropyl, n-butyl, sec.-butyl, isobutyl, tert.-butyl, amyl, hexyl, heptyl, octyl, nonyl, undecyl and dodecyl; monoarylsubstituted lower alkyl radicals, e.g., benzyl-α- and β-phenylethyl; monoaryl radicals, e.g., phenyl; morpholino; piperidyl; morpholinyl substituted with lower alkyl radicals, e.g., ethylmorpholinyl; piperidyl substituted with lower alkyl radicals, e.g., ethylpiperidyl; di-lower alkylamino; pyridyl substituted with lower alkyl radicals, e.g., α, β, and γ methyl- or ethylpyridyl; acid addition salts; and quaternary amines thereof.

Polymers useful in the invention preferably comprise at least 0.1 mole percent and more preferably at least 1 mole percent of monomers, the polymers or copolymers of which are capable of covalently bonding with gelatin, either directly or with the aid of a grafting agent.

In one embodiment of the invention, the polymer useful in the present invention is represented by the formula:

$$-(A)_x-(B)_{100-x}- \quad (IV)$$

wherein A represents recurring units derived from one or more of the monomers described above that are capable of covalently bonding with gelatin, and B represents recurring units derived from one or more other ethylenically unsaturated monomers.

Monomers represented by B include essentially any monomer capable of copolymerizing with the above-described monomers without rendering them incapable of covalently bonding with gelatin. Examples of such monomers include ethylenically unsaturated monomers such as styrene and styrene derivatives (e.g., vinyltoluene, divinylbenzene, and 4-t-butylstyrene), and acrylic and methacrylic acid esters (e.g., methyl methacrylate, methyl acrylate, ethyl methacrylate, n-butyl acrylate, 2-ethylhexyl methacrylate, 2-hydroxyethyl methacrylate, 2-hydroxyethyl acrylate, ethylene dimethacrylate, methacrylamide, and acrylonitrile). Preferred particles comprise butyl acrylate, ethyl acrylate, 2-ethylhexyl acrylate or propyl acrylate in weight percent from 40 to 98 percent of the total polymer. Among the comonomers B, it is preferred that there be incorporated sufficient monomers which impart a low glass transition temperature (Tg) to the polymer. By low Tg is meant below about 20° C., preferably below about 10° C. Typical monomers which contribute to low Tg's are butyl acrylate, propyl acrylate, 2-ethylhexyl methacrylate and lauryl methacrylate. The amounts of such monomers can be up to about 98%. In such a copolymer, the amount of comonomer that is capable of covalently bonding with gelatin should be sufficient to bind a contiguous layer of gelatin to the surface of the polymer particle.

In the above formula, x represents from 0.1 to 100 mole percent and preferably from 1 to 20 mole percent.

Polymer particles used in the present invention can be any size or shape depending on the use for which they are intended. The core polymer particle can have a mean diameter of from about 10 to $10^8$ nm and preferably from about 10 to 500 nm and most preferably 10 nm and 200 nm for best granularity and developability. Mean diameter of a particle is defined as that measured by photon correlation spectroscopy.

The gelatin to be covalently bound to the polymer particles can be any of the known types of gelatin. These include, for example, alkali-treated gelatin (cattle bone or hide gelatin), acid-treated gelatin (pigskin or bone gelatin), and gelatin derivatives such as partially phthalated gelatin, acetylated gelatin, and the like, preferably the deionized gelatins. The gelatin covalently bound to the polymer particles may be cross-linked through the use of a conventional cross-linking agent. The gelatin layer on the polymer particles is preferably on the order of the thickness of one gelatin molecule. The actual thickness of the gelatin layer will depend on factors such as the molecular weight of the gelatin, the pH and the size of the particle, and is generally from about 10 to 60 nm and preferably from about 10 to 40 nm.

The polymer particles can be prepared by techniques well-known in the art, such as by polymerization followed by grinding or milling to obtain the desired particle size, or more preferably by emulsion or suspension polymerization procedures whereby the desired particle size can be produced directly as stable dispersions. Emulsion polymerization techniques can be employed to produce particle sizes ranging from about 10 to 5000 nm (preferably about 20 to 1000 nm) as stable aqueous dispersions that can be coated directly without isolation. Larger size particles, i.e., over about 3 μm are preferably prepared by suspension polymerization, often in an organic solvent system from which the particles are isolated and resuspended in water for most economic coating procedures, or most preferably by "limited coalescence" procedures taught by U.S. Pat. No. 3,615,972 (R-26). The bulk, emulsion, and suspension polymerization procedures are well known to those skilled in the polymer art and are taught in such text books as W. R. Sorenson and T. W. Campbell, *Preparative Methods of Polymer Chemistry*, 2nd ed., Wiley (1968), New York (R-27) and M. P. Stevens, *Polymer Chemistry—An Introduction*, Addison Wesley Publishing Co., London (1975) (R-28).

The polymer particles, if the polymer is of the type as described above that is capable of bonding directly with gelatin, may be covalently bonded with gelatin simply by contacting the particles with gelatin under conditions as described below. If the polymer is of the type that utilized a grafting agent to bond with gelatin, the polymer particles are preferably first contacted with the grafting agent and then with gelatin, so that the gelatin preferentially reacts with the polymer particles, instead of gelatin-gelatin cross-linking. Carbamoylpyridinium and dication ether grafting agents are advantageously utilized in the practice of this invention because they tend to first bond to a carboxyl group on a polymer particle and then with an amino group on the gelatin molecule. In a preferred form of the invention the soft polymer core contains at least 0.1 mole percent of a monomer with at least one pendent carboxylic acid group or 1 mole percent of methacrylic acid monomer.

The contacting of the polymer particles and gelatin is preferably performed in an aqueous dispersion of the particles. The concentration of polymer particles in the aqueous dispersion is preferably less than about 25% and more preferably less than about 15% by weight. The concentration of gelatin in the aqueous dispersion is preferably less than about 25% and more preferably less than about 15% by weight.

The pH of the aqueous dispersion and the concentration of the particles and gelatin should be adjusted to prevent bridging of gelatin molecules between polymer particles, or coagulation. The pH of the gelatin is preferably maintained above the isoelectric pH of the gelatin (e.g., above 4.8 and preferably between 8 and 10 for lime-processed bone gelatin). Under such conditions, both the particles and the gelatin should have the same charge, preferably negative, in order to minimize coagulation.

A particularly preferred embodiment of the material of this invention is a particulate carboxylated polymer wherein repeating unit B is derived from a monomer that causes the polymer to have a low glass transition temperature, for example, butyl acrylate, propyl acrylate, ethyl acrylate, ethylhexyl acrylate, and repeating unit A is derived from a monomer having a pendant acid group such as methacrylic acid. The composition of this copolymer is preferably such that x is between 0.1 to 20 mole percent. The grafting reaction of gelatin to polymers is carried out at a ratio between 10 part gelatin to 1 part polymer latex and 1 part gelatin to 10 parts polymer latex, preferably between 2 parts gelatin to 1 part polymer and 1 part gelatin to 2 parts polymer. The grafting agents utilized are preferably either carbamoylonium compounds or dication ethers. Particularly preferred are the carbamoylonium compounds 13 through 17 of Table I or suitable salts thereof. It is preferred for this invention that the gelatin-grafted-polymer material be washed extensively either by dialysis or diafiltration to remove traces of reaction by-products and low molecular weight species.

Films of such gelatin-grafted-polymer particle material can be made by conventional coating processes that produce dry films having thicknesses up to about 0.005 cm. Additional conventional gelatin cross-linking agents that can be used for preparing wet films are listed in Table III.

TABLE III

Some Conventional Gelatin-Hardening Agents

| | Conventional Gelatin Crosslinking Agents Number |
|---|---|
| $CH_2{=}CH{-}SO_2{-}CH_2{-}SO_2{-}CH{=}CH_2$ | 1 |
| $CH_2{=}CH{-}SO_2{-}CH_2{-}O{-}CH_2{-}SO_2{-}CH{=}CH_2$ | 2 |
| 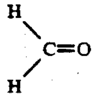 | 3 |
| 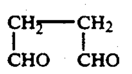 | 4 |
| $CH_2{=}CH{-}CHO$ | 5 |
| $OHC{-}(CH_2)_3{-}CHO$ | 6 |
| $Al_2(SO_4)_3$ | 7 |
| $Cr_2(SO_4)_3$ | 8 |

Conventional hardeners Nos. 1, 2, and 6 are most preferred. Such gelatin grafted polymer films can swell to weights containing 90% water. Gelatin-grafted-polymer particles made of low glass transition temperature (Tg) (less than 25° C.) polymer particles having diameters less than 100 nm produce films that can be hydrated to the extent of 90%, are preferred embodiments of this invention.

Figure 1:
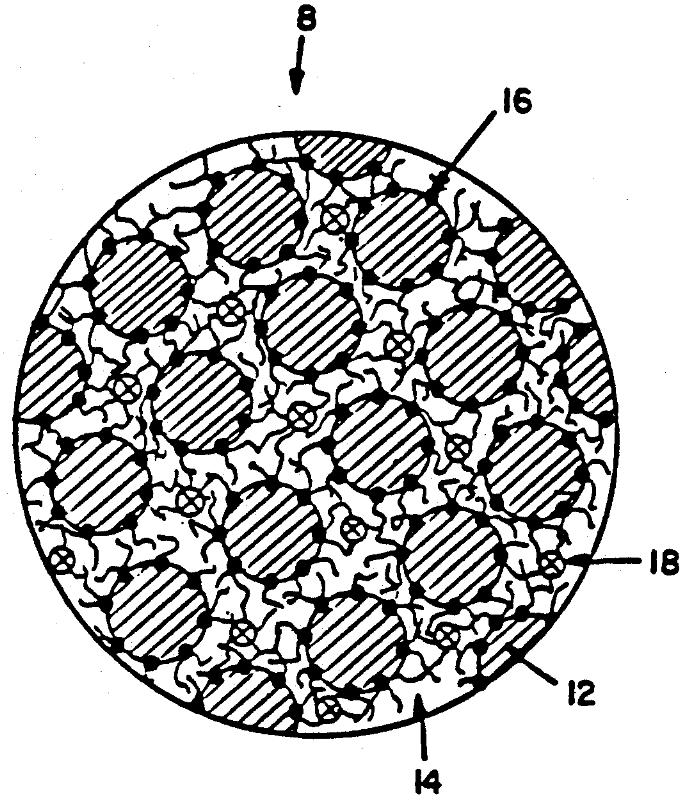

FIG. 1 is a schematic of a submicroscopic view of a circular section 8 of a gel-grafted-polymer particle film. The uniform low-Tg polymer particles 12 are surrounded by gelatin phase 14. The gelatin is grafted to the particles (less than 100 nm diameter) at points 16. The gelatin is cross-linked at intersection points 18. In a dry state, the outer gelatin phase is glassy and the particle phase is rubbery, which results in a flexible film (unlike a 100% gelatin film, which is brittle). When swollen to contain about 90% water, the outer gelatin phase allows the diffusion of developer through the membrane (or film). Thus, such material does not cause inhibition of development as encountered in films containing equivalent high load of soft polymer particles.

Figure 2:
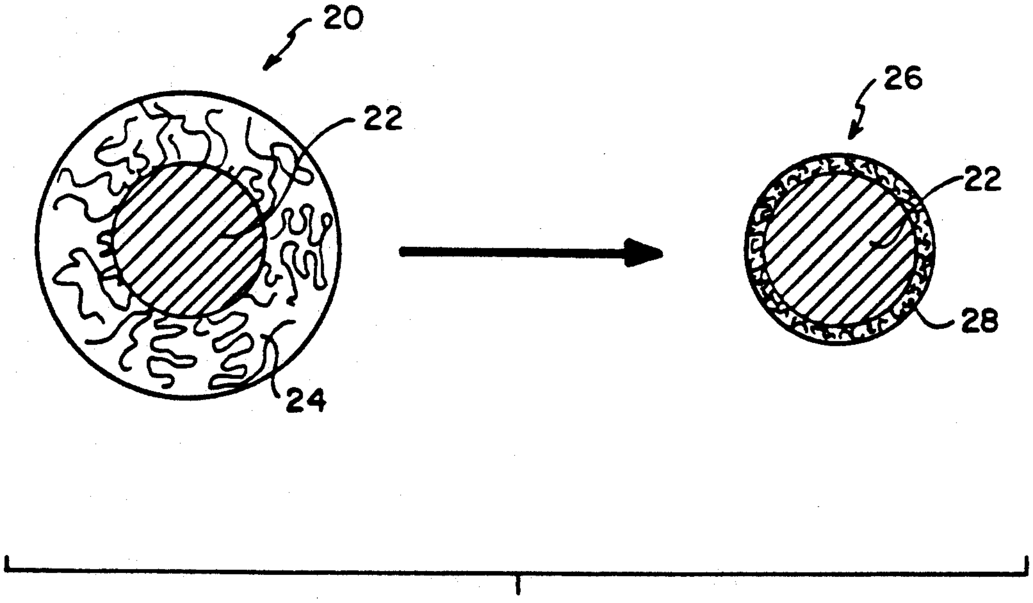

In a preferred embodiment, the monomolecular layer surrounding the gelatin-grafted soft polymer particles can be further crosslinked to produce a thin hard shell (in dry coatings) by case hardening of the gelatin as indicated in FIG. 2 and as will be demonstrated by reduction to practice in the Examples. FIG. 2 shows that when extra gelatin hardener is added to an already gelatin-grafted soft polymer particle 20, with the core polymer particle 22 and a bonded monomolecular layer of gelatin 24, around it as described in (R-11 and R-12), hardening of the gelatin shell results, as there is no free gelatin left in solution, leading to case-hardened gelatin-grafted soft polymer particle 26, having the same soft core particle 22 but with a hardened shell 28. Such a case-hardened soft polymer particle is preferred in this invention.

Use of such material in photographic film system as agents to relieve pressure sensitivity is further disclosed in U.S. patent application Ser. Nos. 497,472 and 497,456, both of which have now been allowed. Case-hardened gelatin-grafted polymer particles of dimensions of 10 mm or larger may be used as biocompatible prosthetic materials on the surface of implants. The layer particles are also suitable for use in shock absorbers for machinery and other industrial applications.

EXAMPLES

The following examples are intended to be illustrative and not exhaustive of the invention. Parts and percentages are by weight unless otherwise specified:

EXAMPLE 1

Preparation of Poly(styrene-co-methacrylic Acid-co-Divinyl Benzene) Particles [weight Ratio 90/5/5] (Particle A)

Sodium chloride (2888 g), potassium dichromate (11 g), diethanolamine adipate (49.5 g), and Ludox AM colloidal $SiO_2$ particles (550 g) were sequentially added to 8690 g distilled water to form an aqueous solution. To this solution was added a mixture of styrene (5940 g), methacrylic acid (330 g), divinylbenzene (330 g), and 2,2'-azobis-(2,4-dimethylvaleronitrile) (69.3 g). This mixture was stirred vigorously for 2 minutes and then emulsified in a homogenizer at 5000 psi. The resulting emulsion was placed in a reaction vessel, which was sealed. The emulsion was heated to 50° C. while being stirred at 80 rpm and held at that temperature for approximately 20 hours. The mixture was then heated to 75° C. and held at that temperature for 3 hours, cooled to room temperature, and filtered through a double layer of cheese cloth. The polymer particles were then filtered out of the dispersion using a Buchner funnel with 230 grade filter paper and redispersed in a solution of 11.5 kg distilled water, 1200 g 50% sodium hydroxide, and 8.34 g sodium dodecyl sulfate, and stirred vigorously for 15 minutes. The polymer particles were filtered out using the same filter apparatus, redispersed in a solution of 11.66 kg distilled water and 600 g 50% sodium hydroxide, filtered out again, and washed with distilled water. The polymer particles had mean diameter of 6.4 μm.

This is not a preferred polymer particle of the invention but has been used to demonstrate that grafting chemistry used in Example 2 does indeed chemically bond amine-group containing protein molecules to the surface of particles that contain pendent carboxyl groups. Such large size particles were chosen as they are easy to centrifuge to remove any unbound soluble protein in the aqueous solution phase. The polymer particle of this example will be called Particle-A. Particle-A, as is indicated in the synthesis contain 90% styrene, 5% methacrylic acid and 5% divinyl benzene.

EXAMPLE 2

Attachment of a Protein to Polymer Particle-A of Example 1

In this demonstration of chemical attachment using the carbamoylonium grafting agent-15, tritium labeled bovine gamma globulin (BGG) has been used instead of gelatin as radioactive BGG which can be easily obtained commercially. Both BGG and gelatin are biological protein molecules and are hence polypeptides and both therefore contain amine and carboxylic acid groups. The former as indicated earlier is involved in the chemical grafting process to the particle when carbamoylonium grafting agent 15 is used. The difference between BGG and gelatin is that BGG is still structurally undenatured and gelatin is completely denatured and exists in random coil configuration in aqueous solution. In other words, the BGG sample still maintained its hydrogen bonded globular structure. The second advantage of using BGG is that such structured absorbed protein molecules can be easily displaced from the surface by the addition of the surfactant sodium dodecyl sulfate (SDS). This is not possible in the case of denatured gelatin molecule as it adsorbs like a randomly coiled molecule with tails, trains, and loops rather than somewhat continuously like a globular protein. This property has been utilized to demonstrate chemical bonding, as only chemically unbound BGG can be displaced by the addition of SDS whereas chemically bonded gelatin molecules to a surface cannot be displaced by the addition of SDS, easily.

A solution containing 5.29 g of water and 0.000232 mole of the carbamoylonium compound-15 1-(4-morpholinocarbonyl)-4-(2-sulfoethyl)pyridinium hydroxide, inner salt, was added to a mixture of 45.71 g of distilled water and 50 ml of a 4% suspension (pH 8.0) of Particle-A of Example 1. The resultant mixture had a pH of about 8.0. A portion of the above activated latex containing 100 mg of polymer (dry weight) was incubated at 60° C. temperature for 15 minutes. To the incubated solution was added 100 mg of labeled (tritated) bovine gamma globulin ($^3$H BGG) solution of pH=8. The mixture was brought to a final volume of 30 ml with NaOH solution at pH=8.0 in a 50 ml centrifuge tube. The grafting reaction was continued for another 15 minutes at 60° C. with end-over-end rotation at 30–35 rpm while attached to a rotating plate mounted at a 45° angle.

A second experiment was done exactly in the same manner as above except no grafting agent was added.

The total amount of protein was determined by measuring: a) the total cpm (counts per minute) in a 1 ml aliquot of the reaction mixture, b) the cpm remaining in the supernatant following centrifugation of a 1 ml sample of the reaction mixture and c) the cpm of the latex reagent following repeated washes of the pellet obtained in (b) after a first wash with water and then with 5% SDS solution. The quantity of the protein which was bound to the particles was calculated from knowing the specific surface area of the particles (0.94 m$^2$/g, computed from the particle diameter of 32 microns and the reasonable assumption of particle density to be equal to 1 g/ml). The results are tabulated in Table IV.

TABLE IV

| Binding of $^3$H BGG to Particle A $^3$H BGG Bound in mg/sq m | | |
|---|---|---|
| Sample | After washing with Distilled Water | After washing with 5% SDS Solution |
| Treated with Grafting Agent | 11.0 | 9.3 |
| Not Treated With Grafting Agent | 6.2 | 0.8 |

Figure 3:
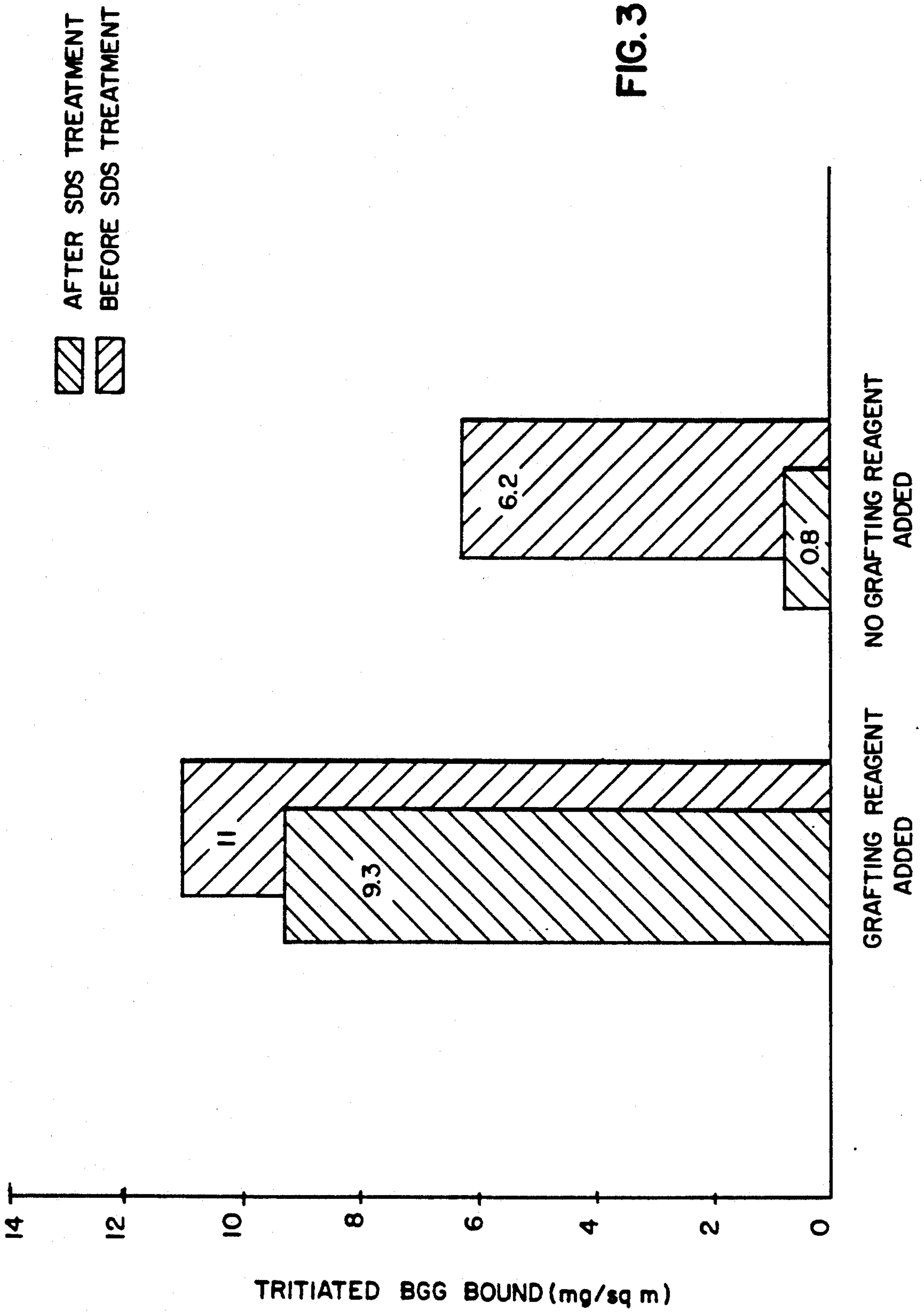
FIG. 3 shows binding of $^3H$ BGG to polymer particle-A of Example-1 demonstrate chemical grafting.

These results are also shown in FIG. 3. They indicate that in the case where grafting agent was not used, just distilled water washed sample indicated a $^3$H BGG binding of 6.2 mg/sq m. This is indication of the fact that physically adsorbed BGG cannot be washed off the partile surface by washing with water but when washed with the SDS solution, most of the BGG was removed from being bound to the particle. In other words, with no grafting reagent the BGG was not chemically bound and was displaced by SDS. The sample that was treated with the grafting reagent, even the SDS solution wash was unable to remove the BGG from the particle surface. This tends to prove real chemical bond formation between the protein molecule and the particle surface in presence of the grafting agent and can be considered as evidence of chemical grafting.

EXAMPLE 3

Preparation of Poly(styrene-co-Butyl Acrylate-co-Meltracrylic Acid) Particles [weight Ratio 20/75/5] (Particle B)

The latex polymer of this example was prepared to determine optimal grafting conditions.

A 5 l three-neck round bottom flask fitted with a condenser and a stirrer was charged with 3 l of distilled water and heated to 60° C. The following were added to the flask after nitrogen purging for 10 minutes:

6 g $K_2S_2O_8$
3 g $K_2S_2O_5$
6 g sodium dodecylsulfate (SDS).

The following monomers were mixed together and added to the flask:

styrene 60 g
butyl acrylate 225 g
methacrylic acid 15 g.

The reaction was carried out under nitrogen for 18 hours at 60° C. The resultant latex was filtered through glass wool and the solids were determined to be 9.23%.

EXAMPLES 4 THROUGH 12

Grafting of Gelatin to Polymer Particle B of Example 3 to an Equal Dry Weight of Gelatin Using Various Quantities of the Carbamoylonium Grafting Agent-15 for Definition of Grafting Conditions 5 Kg of a gelatin solution at 8.97% solids were prepared, heated to 60° C. and pH adjusted to 8.0. Gel-g-latex samples (Examples 5 through 12) and one sample of gel mixed with latex (Example 4, Control) were prepared by the following general procedure. The various amounts of the carbamoylonium grafting agent-15 used are listed in Table V.

to its addition to the latex. Reaction was carried out for 15 minutes at 60 C. with stirring and then 513 g of the

TABLE V

Preparation of Gel-g-Latex Particle B [50% Gelatin] Using Various Amounts the Carbamoylonium Grafting Agent 15 and Their Viscosities

| Example | g of 9.23% Latex Particle B Dispersion at 60° C. and pH = 8.0 | g of dry Polymer | g of 8.98% Gelatin Solution at 60° C. and pH = 8.0 | g of dry Gelatin | g of carbamoylonium Grafting Agent-15 | g of Grafting Agent per g of Gel (× $10^2$) | Brookfield Viscosity of gel-g Latex Samples cP at 45° C. |
|---|---|---|---|---|---|---|---|
| 4 Control | 500 | 46 | 513 | 46 | 0.00 | 0.00 | 9.32 |
| 5 | 500 | 46 | 513 | 46 | 0.60 | 1.30 | 8.46 |
| 6 | 500 | 46 | 513 | 46 | 1.20 | 2.60 | 7.38 |
| 7 | 500 | 46 | 513 | 46 | 1.80 | 3.90 | 8.72 |
| 8 | 500 | 46 | 513 | 46 | 2.40 | 5.20 | 8.51 |
| 9 | 500 | 46 | 513 | 46 | 3.00 | 6.50 | 9.51 |
| 10 | 500 | 46 | 513 | 46 | 3.60 | 7.80 | 12.82 |
| 11 | 500 | 46 | 513 | 46 | 4.20 | 9.10 | 13.03 |
| 12 | 500 | 46 | 513 | 46 | 4.80 | 10.40 | Cross-linked |

To 500 g of the dispersion of Latex Particle-B of Example 3 at 60° C. and pH 8.0 was added the amounts of grafting agent specified in Table V. The grafting agent was dissolved in 100 g of distilled water just prior gelatin solution at 60° C. and pH=8.0 was added to the latex (in a stirred flask) and reaction carried out for another 15 minutes at 60° C. The gelatin attachment chemistry in these reactions were as follows:

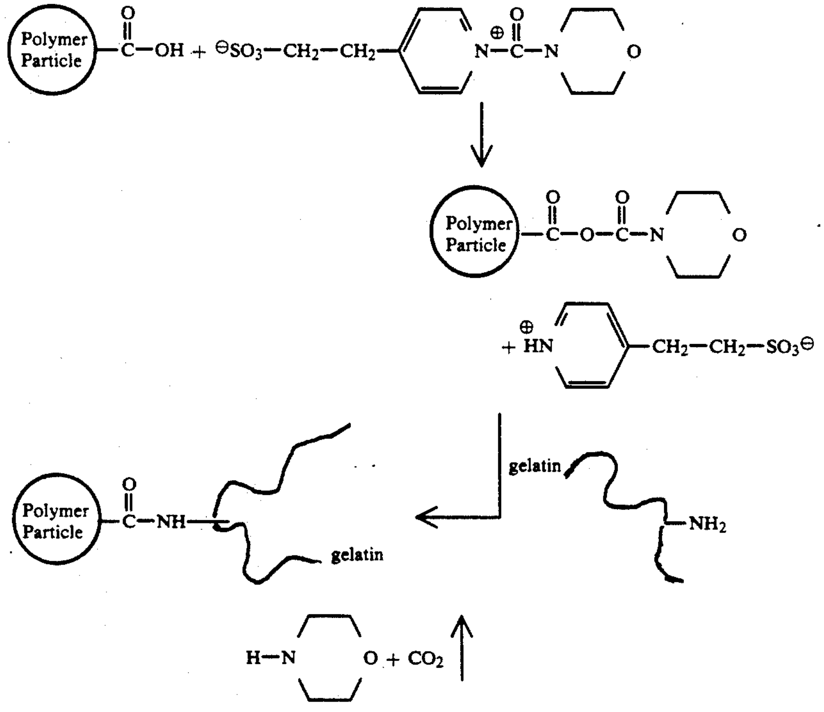

or

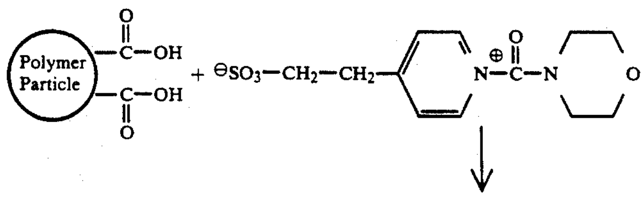

-continued

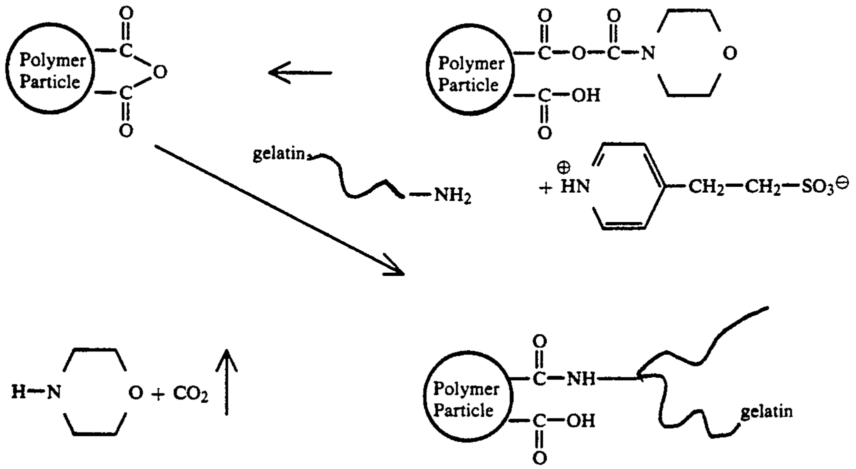

Figure 4:
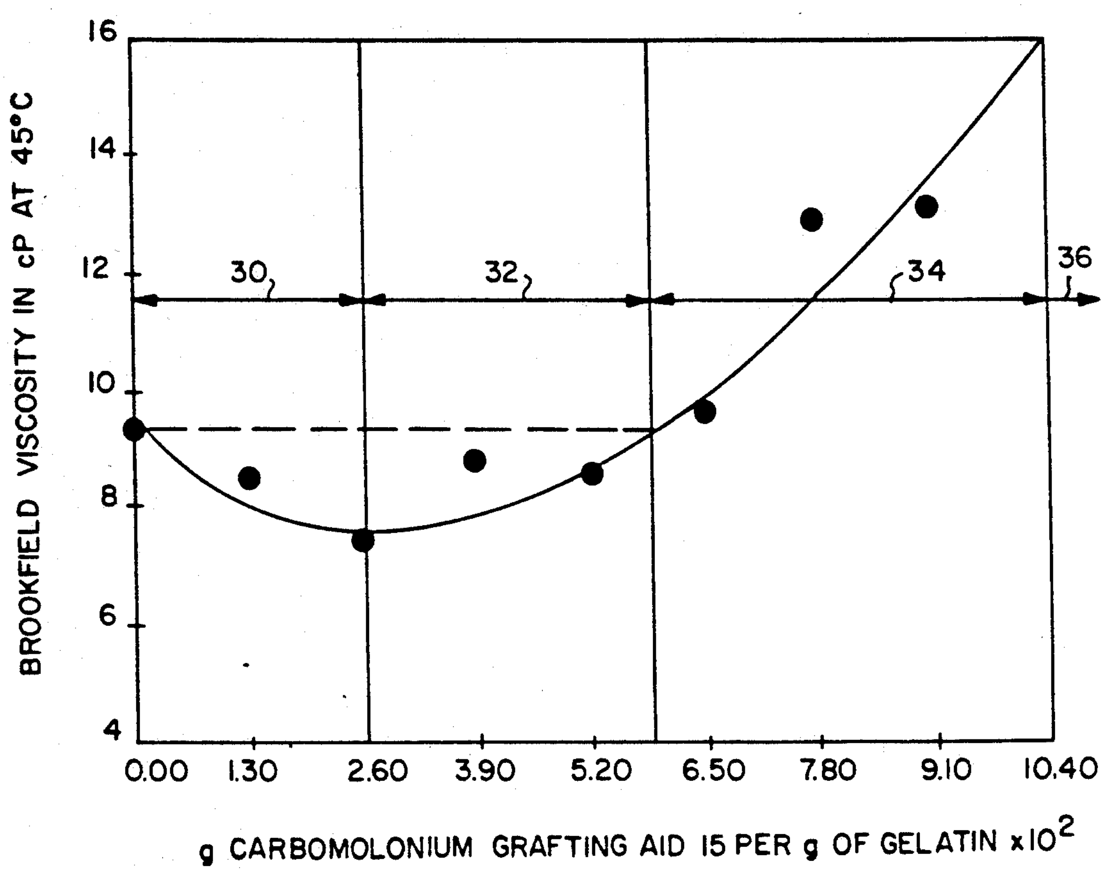
FIG. 4 shows viscosities of gel grafted Latex Particle B [50% gelatin] at 45° C. as a function of the amount of the carbamoylonium grafting agent used.

The samples were refrigerated and the viscosity of each of them were measured at 45° C. using a BROOKFIELD viscometer. The viscosity values are also listed in Table V. FIG. 4 shows a plot of the viscosities of the gel-g-Latex Particle-B samples as a function of the weight of the grafting agent used per g of gelatin. It is observed in FIG. 4, that the viscosity of the gel-g-Latex Particle-B as a function of the amount of the grafting agent goes through a shallow minimum at 2.60 g of grafting agent per g of gelatin. This is considered to be the optimum grafting condition. The viscosity of the dispersion is lowered up to this concentration as attachment of the gelatin molecules reduce the interaction between each other as they become chemically bonded to the particle surface. The regions marked 30 and 32 are thus considered to be the regions where the essential reaction is gelatin-grafting to the surface of the polymer particles. Therefore, the range is between about $1.3\times10^{-2}$ g and about $6.0\times10^{-2}$ g to obtain gelatin grafted particles. The increase of viscosity in the region 34 is considered to be due to partial cross chemical attachment between particles. At the higher end of this region where particle cross attachment is large, the material is difficult to use. In region 36, beyond 10.40 g of the carbamoylonium grafting agent per g of gelatin, the gel-grafted particles are extremely highly cross attached to form an unmeltable gel and is not useful at all. Thus, these experimental boundaries define conditions for the preparation of useable gelatin-grafted polymer particles.

EXAMPLE 13

Preparation of Poly(styrene-co-Butyl Acrylate-co-Methacrylic Acid) [Weight Ratio 38/38/24] (Particle C)

A 5 L three-neck round bottom flask fitted with a condenser and an air stirrer was charged with 4 L of nitrogen purged distilled water and heated to 60° C. in a constant temperature bath. The following were added to the flask.

Styrene; 152 g
Butyl acrylate; 152 g
Methacrylic acid; 96 g
Sodium dodecyl sulfate (SDS); 0.4 g
$K_2S_2O_8$; 2.0 g
$K_2S_2O_5$; 1.0 g.

The reaction was carried out under nitrogen for 20 hours at 60° C. The resulting latex was dialyzed against distilled water for 56 hours. Particle diameter of the latex was determined by Photon Correlation Spectroscopy to be 98 nm. The surface area of the sample is $3/\rho r$ (where $\rho$ is the density of the particles (assumed ~1.0 g/cc) and r is the particle radius), or about 62 $m^2/g$ of dry particles. Final latex dispersion isolated was 4.11 kg @8.3% solids.

EXAMPLE 14

Grafting of Gelatin to Polymer Particle C of Example 13

4.11 Kg of the dispersion of Latex Particle C of Example 13 was placed in a 12 l 3-neck round bottom flask fitted with a condenser and an air stirrer. The pH was adjusted to 8.0 with 20% NaOH solution. At the rate of 8.3% solids, the amount of polymer in the reactor was $4110\times0.0833$ g=341 g. The saturation adsorption of gelatin on surface is of the order of 10 mg per $m^2$ at pH around 8.0 (R-29). Therefore dry gel needed to obtain about 75% surface coverage, such that no gelatin is left free in solution for 4.11 Kg of the dispersion (=341 g of latex$\times$62 $m^2/g$ surface area of latex$\times$0.010 $g/m^2$ of gel for saturation adsorption$\times$0.75) is equal to 158 g. The carbamoylonium grafting agent 15 used was $2.5\times10^{-2}$ g per g of gelatin (=4.1 g). According to FIG. 4, this is just about the point of optimal grafting. The grafting agent was added to the latex dispersion at 60° C. and pH=8.0 and allowed to react for 15 minutes with stirring at 60° C. 158 g of dry gelatin was dissolved in 1640 g of distilled water and adjusted to 60° C. and pH=8.0. The gel solution was then added to the latex dispersion and allowed to react under stirring at 60° C. for another 15 minutes for the grafting reaction to take place as indicated earlier. The composite had $(158\times100)/(158+341)=32\%$ gel in the total solid residue. Total solids of the dispersion was determined to be 8.5%.

EXAMPLES 15 through 17

Case Hardening of Gel-g-Latex Particle of Example 14 by the Addition of Extra Carbamoylonium Compound 15

Preparation of Examples 15, 16 and 17 were done as follows: 100 g of the gel-g-Latex Particle C of Example 14 was heated to 60° C. in a beaker and pH was adjusted to 8.0 by using dilute NaOH solution. Predetermined amounts of the carbamoylonium compound-15 in 10% aqueous solutions (freshly prepared) was added to the gel-g-latex dispersions as indicated in Table VI and reaction carried out at 60° C. for 15 minutes. Each dispersion was dialyzed against distilled water for 18 hours at 45° C. to remove all salts. The pH of these dispersions was around 7.0. The hydrodynamic diameters of the particles with the grafted gelatin layers were determined by photon correlation spectroscopy (PCS). Results are shown in Table VI and FIG. 5. The PCS results indicate that as additional crosslinking agent is added, the gelatin layer thickeners of the chemically bonded gelatin shrinks because of case-hardening. Since there is no unbound gelatin in solution, the hardening agent goes to the surface bound gelatin layer and case-hardens it. Finally a 5 nm (50 Å) thick hydrated bonded and case-hardened gelatin layer was observed. Thus according to FIGS. 4 and 5, for gel grafting conditions that use between $5.20\times10^{-2}$ and $10.4\times10^{-2}$ g of the carbamoylonium grafting agent per g of gelatin, there is formed case hardened gelatin grafted polymer particles. The preferred range is between $5.2\times10^{-2}$ to about $9.10\times10^{-2}$ g of the carbamoylonium grafting agent per g of gelatin to avoid particle to particle cross attachment. Such case hardening can also be achieved by any conventional gelatin hardener as listed in Table III.

The uncase-hardened gelatin layer thickness on a gelatin-grafted polymer particle depends on the molecular weight of gelatin used and pH of the solution. It can vary between 10 and 60 nm depending on molecular weight and pH (U.S. Pat. No. 4,920,004). The hydrated thickness of a case-hardened gelatin grafted layer, therefore, depending upon pH and molecular weight of the gelatin may vary any where between 5 to 25 nm.

TABLE VI

Case-Hardening of Gel-g-Latex Particle-C of Example-14 by Addition of Extra Carbamoylonium Compound-15

| Example | g of Carbamoylonium Grafting Agent Added/g of Gel in Composite × $10^2$ | Total g of Grafting Agent per g of Gel in Composite × $10^2$ | Hydrodynamic Diameter in nm by PCS | Grafted Gelatin Layer Thickness nm |
|---|---|---|---|---|
| 14 Control | 0.00 | 2.60 | 154 | 28 |
| 15 | 2.60 | 5.20 | 150 | 26 |
| 16 | 5.20 | 7.80 | 108 | 5 |
| 17 | 7.80 | 10.40 | 108 | 5 |

Hydrodynamic Diameter of Bare Latex C = 98 nm. Grafted and case-hardened gelatin layer thickness for example in Example 17 = (108 − 98)/2 = 5 nm

EXAMPLE 18

Preparation of Poly(Butyl Acrylate-co-Methacrylic Acid) [Wieght Ratio 95/5] (Particle-D)

A 22 L three-neck round bottom flask fitted with a condenser and an air stirrer was charged with 16 L of nitrogen purged distilled water and heated to 60° C. in a constant temperature bath. The following were added in the flask:

Butyl acrylate: 1520 g
Methacrylic acid: 80 g
Sodium dodecyl sulfate: 32 g
$K_2S_2O_8$: 32 g
$K_2S_2O_5$: 16 g The reaction was carried out under nitrogen for 20 hours at 60° C. Four batches of such latex dispersion were prepared and mixed together. Particle diameter of the mixed batch (Particle-D) as determined by PCS was around 53 nm. Thus was produced about 70 kg of latex at 9.7% solids. The pH of the latex was adjusted to 8.0 using 20% NaOH solution.

EXAMPLE 19

Preparation of Gel-g-Latex Particle D (of Example 18) [50% Gelatin]

30 kg of the dispersion of latex particle D at 9.7% solids and pH=8 was placed in a 10 gallon glass lined reactor fitted with air driven stirrer, a condenser and a nitrogen supply. The reaction temperature was raised to 60° C. and 105 g of the carbamoylonium grafting agent-15 was added. Reaction was carried out with the stirrer at 20 rpm for 20 minutes. In the meantime, in another similar reactor 3.0 kg of dry ossein gelatin was added to 27 kg of distilled water. Temperature was raised to 60° C. and gel was dissolved and pH was adjusted to 8.0 using 20% NaOH solution. After 20 minutes of reaction in the first reactor of the latex with the grafting agent was added the gelatin solution at 60° C. and the grafting reaction carried out at 60° C. for 20 minutes.

Figure 5:
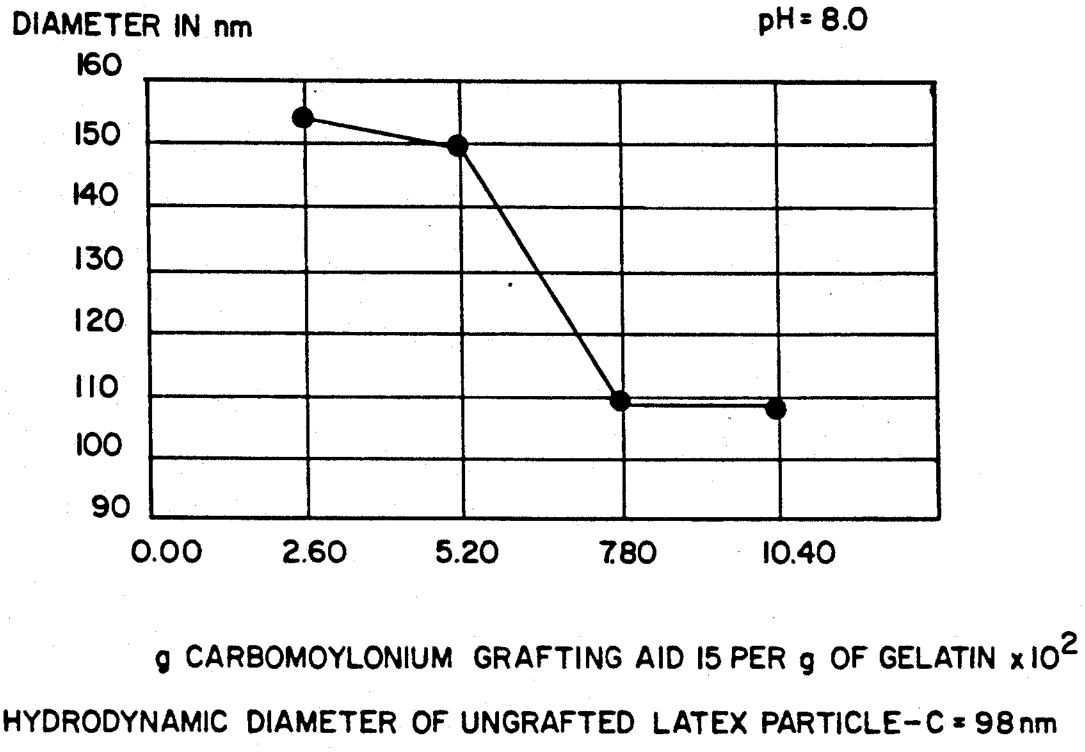
FIG. 5 shows case-hardening of gelatin-grafted polymer particles.

The gel-g-latex was then diafiltered for 3 turnovers using 20,000 molecular weight cutoff spirally wound (4½ inch×36 inch) Osmonics diafiltration cartridge in an associated diafiltration system to remove soluble reaction byproducts. The material was then concentrated to 21.4% solids. It is to be noted that this material has approximately equal weight of gel and latex and thus was called Gel-g-Latex Particle-D [50% Gel]. Grams of the carbamoylonium grafting agent used per g of gelatin was 105/3000=3.5%. According to FIG. 4, this amount falls in region 32 which is the region for grafting of gelatin to particle surfaces. The hydrodynamic diameters of the gel-g-latex material was measured by PCS at pH=7 and was found to be 106 nm, which gives an adsorption layer thickness of (106−53)/2=26.5 nm. This is of the order of the value we get for the uncase-hardened material as indicated in FIG. 5. Therefore, we call this material the uncase-hardened sample.

EXAMPLE 20

Preparation of Case-Hardened Gel-g-Latex Particle D (of Example 18) [33% gelatin]

33.7 kg of the dispersion of latex particle D latex at 9.7% solids and pH=8.0 was placed in the 10 gallon glass lined reactor fitted with an air driven stirrer, a condenser and a nitrogen supply. The reactor temperature was raised to 60° C. and 118 g of the carbamoylonium grafting agent-15 was added. Reaction was carried out with the stirrer at 20 rpm for 20 minutes. In the meantime, in another similar reactor 17.0 kg of 10% gel solution (1.7 kg dry gel) was prepared at 60° C. as described previously. The pH of the gel solution was adjusted to 8.0 using 20% NaOH. After 20 minutes reaction in the first reactor of the latex with the grafting agent, was added the gelatin solution at 60° C. and the grafting reaction carried out for 20 minutes at 60° C.

The resultant material was diafiltered for 3 turnovers using the same equipment as described earlier and concentrated to 13.4% solids. The ratio of gel to latex in this experiment was 1700 g gel per (33700×0.97=) 32689 g of latex is of the order of 0.5. Therefore, of the total solids in the material 33% is gel. The ratio of the weight of the grafting agent and gel in this experiment was 118/1700=6.9%. According to FIG. 4, this amount falls in the region 34, which is the case-hardening region of the gel in the particle surface. The hydrodynamic diameter of the material was determined at pH=7 and was found to be 64 nm. This gives an adsorption layer thickness of (64−53)/2=5.5 nm. This is of the order of the value we get for case-hardened material as indicated in FIG. 5. Therefore, we call this material case-hardened.

EXAMPLES 21-23

Figure 6:
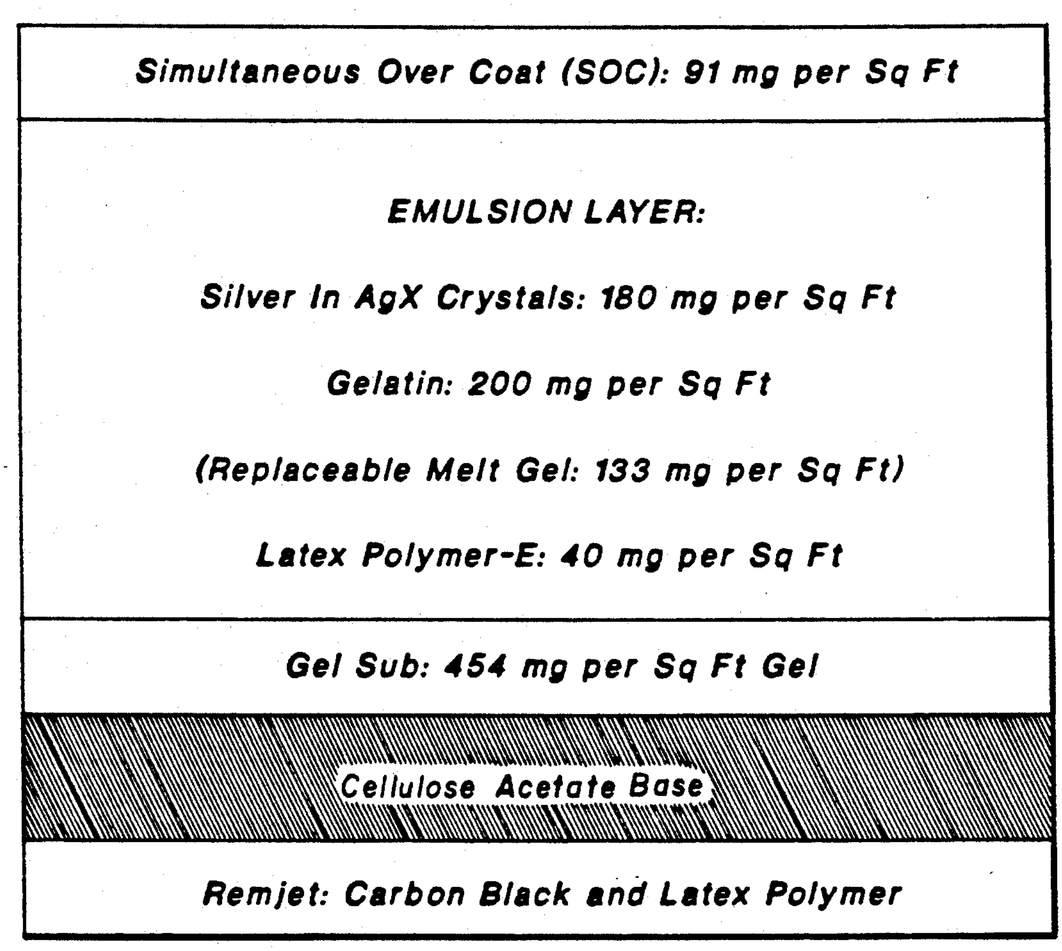
FIG. 6 show KODACHROME magenta monochrome coating format (R-3).

Evaluation of the Materials of Examples 19 and 20 in Photographic Coatings Using a 64 ASA Kodachrome Magenta Single Layer Format A. Coating Format, Exposure and Processing All photographic evaluations were done in a single layer Kodachrome magenta layer format as shown in FIG. 6 and in (R-3). The silver halide crystals used were a fast green sensitized component of KODACHROME 64 ASA speed film. They were 3-dimensional silver bromoiodide material with 5.5% iodide and with an average crystal diameter of 620 nm. The coatings were made using a simultaneous slide hopper coating machine with 11.7 mg per ft$^2$ of the hardener bisvinylsulfonylmethane. Also 3.47 mg per ft$^2$ of surfactant saponin was used as the spreading agent. The control coating was prepared with melt containing gelatin. In the two coatings of the invention, Example 22 and 23 respectively, 133 mg/ft$^2$ of gelatin was replaced by gel-g-latex of Example 19 and case-hardened gel-g-latex of Example 20. The first set was coated and evaluated sensitometrically after processing with and without passage through a smooth pressure roller (at 25 psi) at two different processing locations A (samples a) and B (sample b).

It is to be noted that KODACHROME formulation has 40 mg of a soft polymer latex (as indicated below in its coating format for dimentional stability (see FIG. 6 and reference (R-3)).

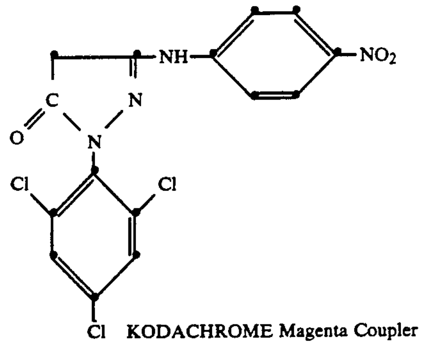

KODACHROME Magenta Coupler M

B. Results

FIG. 7*a*, 7*b* and 7*c* show the sensitometric curves for pressured (25 lbs/sq. inch) and unpressured magenta Kodachrome monochrome all-gelatin control and those of this invention where 133 mg/ft$^2$ of gelatin was replaced, respectively, by 133 mg/ft$^2$ of material of Examples 19 and 20. The sensitometric data for such curves of sets a, b and c are shown in Table VII. It is seen that the normal sensitometric parameters of the various coatings (e.g. Dmax, Dmin, speed and gradient) and their reprocessing in different photofinishing centers show some variability from coating to coating and from processing center to processing center, but are essentially the same in various coatings, indicating the replacement of the 133 mg/sq. ft. of gelatin did not alter the fresh sensitometry or development characteristic of the two coating of this invention compared to the control Kodachrome coating.

FIG. 8(*a*, *b* and *c*) shows plots of increase in density (ΔD) in the pressured area versus the background density of the unpressured areas corresponding to the curves of FIG. 7(*a*, *b* and *c*) to demonstrate the extent of

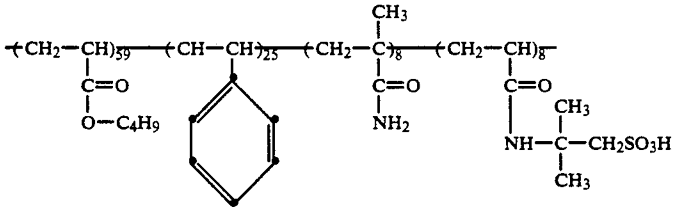

Latex Polymer Particle E (weight ratio indicated).

For confirmation of the effect, an identical set of coatings were prepared (samples c) and photographic responses measured the same way in location B. The photographic process used in location A was a modified K-14 (Kodachrome) deep tank processing that included steps of black and white development and magenta color development with the magenta coupler in the developer (R-3). The temperature of all the tanks were 100° F. and the black and white development step was carried out for 80 seconds. All other conditions of processing were identical as that of the standard published K-14 Kodachrome development process (R-3). The cyan and yellow color development steps were not carried out for such monochrome coating sets. Processing in location B was carried out in a continuous Kodachrome photofinishing machine, which simulates the deep-tank process of location A.

pressure sensitivity. Larger the area under the ΔD vs background density curve worse is the pressure sensitivity. In other words, the two coatings of this invention, Examples 22 and 23, performed better than the control coating 21. The pressure sensitivity performance of the preferred embodiment (case-hardened material) of Example 23 performed the best in showing the least pressure sensitivity. In order to get a quantitative measure of the pressure sensitivity, a pressure sensitivity index Pa was defined by integrating the absolute area (meaning both positive and negative areas) under the plots of ΔD versus background density normalized by the same for the control as given in the following expression.

$Pa =$

-continued $$\frac{\left[\int_{Dmin}^{Dmax} |\Delta \text{Density}| \cdot d(\text{Background Density})\right]_{Experiment}}{\left[\int_{Dmin}^{Dmax} |\Delta \text{Density}| \cdot d(\text{Background Density})\right]_{All\ Gel\ Check}}$$

The Pa values for all the multiple coatings and processing of the three samples of Examples 21 through 23 are given in the last column of Table VII.

TABLE VII

Sensitometric data for Magenta Kodachrome Monochrome Coating With and Without Replacement of 133 mg/ft$^2$ of Gelatin by Gel-g-Latex Particle-D (Example-19) and Case-Hardened Gel-g-Latex Particle-D (Example-20)

| Coating | 133 mg/ft$^2$ | Dmax | Speed 0.3 Below Dmax | Dmin* | Avg. Gradient Between 0.5 + 2.2 | Pa |
|---|---|---|---|---|---|---|
| Control | gelatin | a) 3.47 | 218 | 0.27 | 1.61 | 1.00 |
| Example-21 | | b) 3.20 | 219 | 0.20 | 1.72 | 1.00 |
| | | c) 2.97 | 208 | 0.13 | 1.75 | 1.00 |
| Invention | Material of | a) 3.66 | 215 | 0.28 | 1.38 | 0.92 |
| Example-22 | Example-19 | b) 3.40 | 207 | 0.19 | 1.71 | 0.87 |
| | | c) 3.39 | 210 | 0.13 | 1.78 | 0.63 |
| Preferred | Material of | a) 3.94 | 212 | 0.25 | 1.58 | 0.47 |
| Invention | Example-20 | b) 3.56 | 208 | 0.14 | 1.86 | 0.57 |
| Example-23 | | c) 2.95 | 208 | 0.11 | 1.75 | 0.41 |

*Density on last observable step
a) Processed in Location A
b) Reprocess and retesting of set a) in location B.
c) Recoating, processing, and testing in location B In physical sense Pa is the absolute area (both sensitization and desensitization) under the ΔDensity vs Background Density curve normalized by the same curve for the all-gelatin check to be equal to 1.00. It is therefore seen in Table VII that the Pa values for the sets a, b and c of the all-gel check are all equal to 1.00. In the case of the examples of this invention it is seen that with the replacement of 133 mg/ft$^2$ of gelatin by gel-g-Latex of Example 19, produced small but measurable lowering of the pressure sensitivity index Pa to between 0.92 to 0.63. However, in the case of the more preferred material, case-hardened gel-g-Latex of Example 21 the lowering of the pressure sensitivity index Pa is substantial (0.41 to 0.57) and this embodiment of the invention is more preferred. In the actual coatings of Table VII the pressure mark on the control strips indicated vivid roller marks under pressure of 25 psi. The strips of Example 22 showed faint pressure marks. In the strips of the preferred embodiment of coatings of Example 23, the roller marks were virtually invisible. It is also to be noted that the control coating has incorporated in it 40 mg/ft$^2$ of Latex Particle E, a soft polymer latex. In spite of this, it exhibits considerable pressure sensitivity. Therefore, we believe that the case-hardened gel-g-soft latexes and the gel-g-soft latex in the coating of this invention appears to be most efficacious over the polymer latex-E, use of excessive amounts of which show developability problems.

FIG. 9 shows a conceptional interpretation of the observed effect of relief from pressure sensitivity. The case-hardened gelatin-grafted soft latex particles, 40, with their low glass transition cores and highly cross-linked hard shells as a composite act as a viscoelastic filler which can absorb applied stress by deforming and springing back to its original shape due to the elastic case-hardened shells. This behavior is classically compared to a series of spring and dash pots (shock absorbers), 42, in the coating interspersed among the pressure sensitive Ag-halide grains, 44.

The invention has been described in detail with particular reference to preferred embodiments thereof, but it will be understood that variations and modifications can be effected within the spirit and scope of the invention.

We claim:

1. A case-hardened particle comprising polymer core having a mean diameter from about 10 nm to $10^8$ nm covered with a cross-linked gelatin shell up to 10 nm in thickness the gelatin molecules in said shell being cross-linked to each other and covalently bonded chemically to the surface of the polymer particle wherein the ratio of hard gelatin to the polymer core is between 1 to 2 and 2 to 1 parts by weight and wherein the polymer core comprises butyl acrylate, ethyl acrylate, 2-ethylhexyl acrylate or propyl acrylate in weight percent from 40 to 98% of the total polymer.

2. The particle of claim 1 wherein the polymer particle core of said particle comprises the monomers butylacrylate and methacrylic acid in a weight ratio of 95:5.

3. The particle of claim 1, where the polymer particle is between 10 nm and 200 nm in diameter.

4. The particle of claim 1, where the core polymer particle has a glass transition temperature of less than 25° C.

5. The particle of claim 1, wherein the polymer core contains at least 0.1 mole percent of a monomer with at least one pendent carboxylic acid group.

6. The particle of claim 1 wherein the polymer particle comprises of at least 1 mole percent of methacrylic acid monomer.

7. The particle of claim 1 wherein the polymer particles are bonded to gelatin by a grafting agent selected from the group consisting of carbamoylonium compounds, dication ethers and carbodiimide compounds.

8. The particle of claim 1 wherein said polymer particle is bonded to gelatin by using grafting agent 1-(4-morpholinocarbamoyl)-4-(1-(sulfoethyl)pyridinium hydroxide inner salt.

9. The particle of claim 1 wherein the polymer particle is derived from polymer particles capable of directly bonding to gelatin without a grafting agent.

10. The particle of claim 1 wherein the polymer particle is derived from a polymer that contains at least 0.1 mole percent of monomers selected from the group consisting of monomers containing active halogen containing groups, aldehyde groups, azindine groups and isocyanate groups.

11. The particle of claim 7 wherein said grafting agent per gram of gelatin is between about $1.3\times10^{-2}$ g to about $6.0\times10^{-2}$ g, to obtain the gelatin-grafted polymer particle.

12. The particle of claim 1, wherein the case-hardening agent for case-hardening said particle is selected from the group consisting of bis(vinylsulfonylmethyl) ether, bis(vinylsulfonyl) methane, glutaraldehyde, carbomoylonium compounds, and mixtures thereof.

13. The particle of claim 1 wherein the grafting agent attaching the gelatin to said particle and the case-hardening agent cross-linking said shell is selected from the group consisting of at least one of the compounds comprising

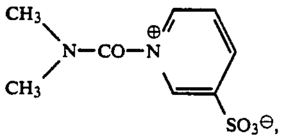

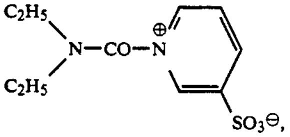

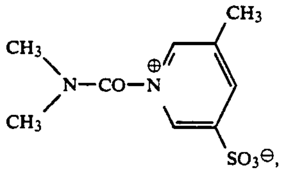

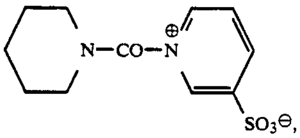

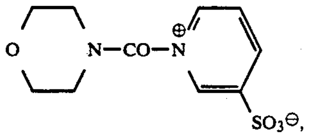

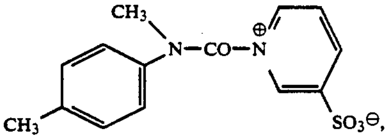

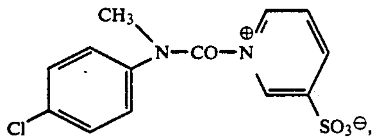

-continued

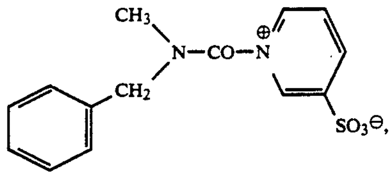

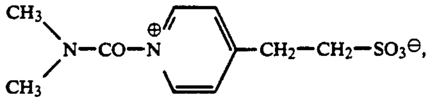

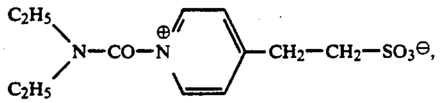

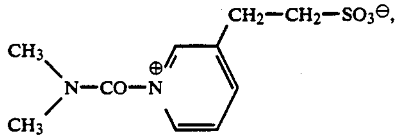

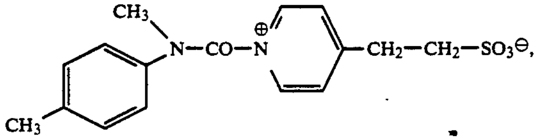

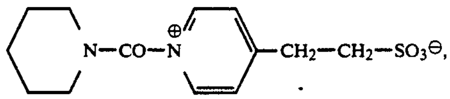

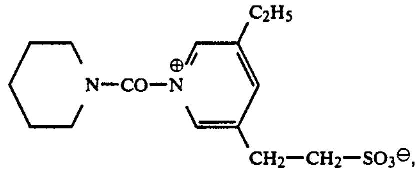

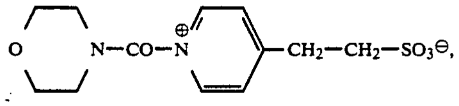

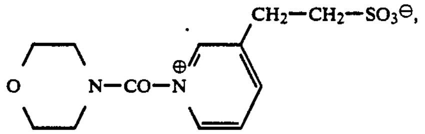

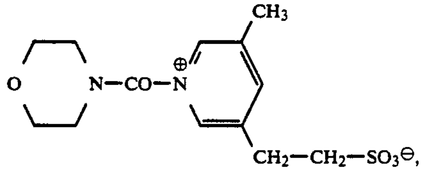

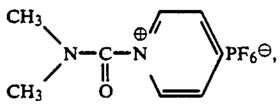

-continued
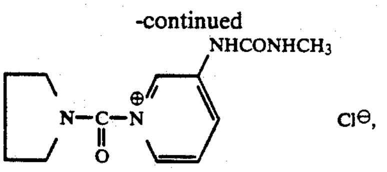
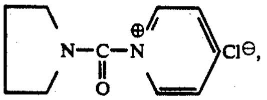
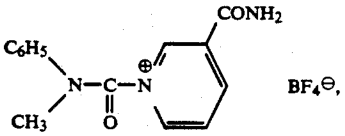
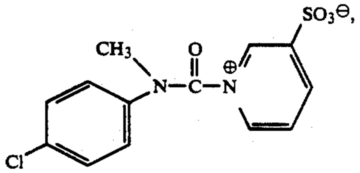
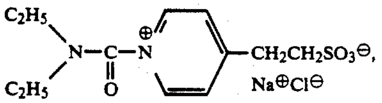
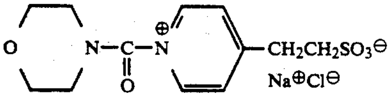
and
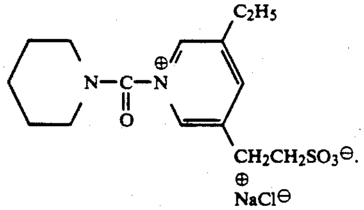
14. The particle of claim 1 wherein the grafting agent attaching the gelatin to said particle and the case-hardening agent cross-linking said shell is selected from the group consisting of at least one of the following dication ether compounds
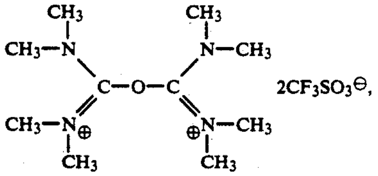
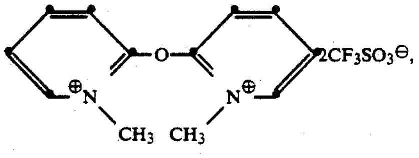
-continued
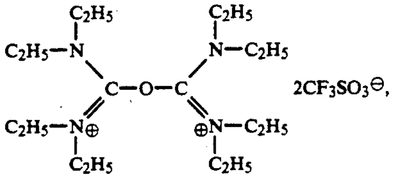
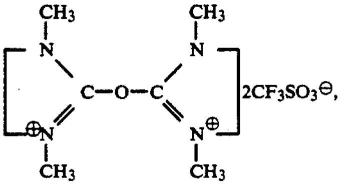
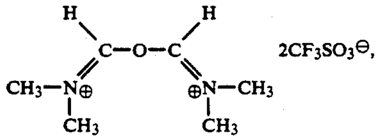
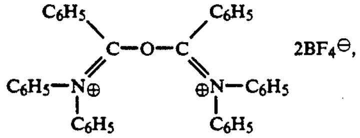
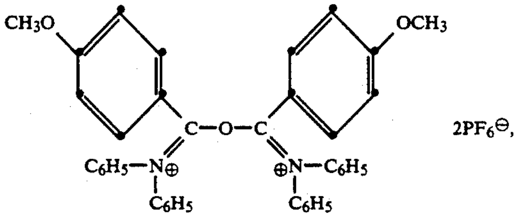
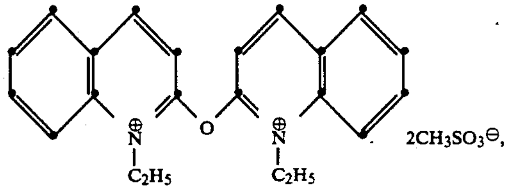
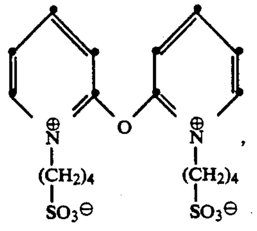
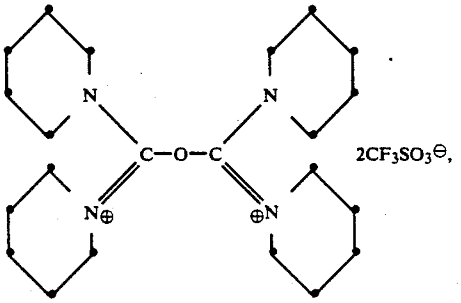

-continued
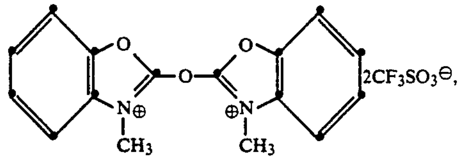
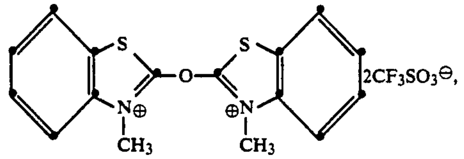
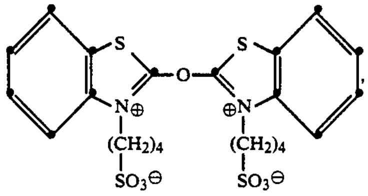
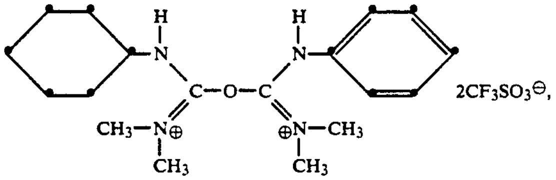
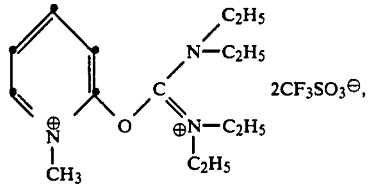
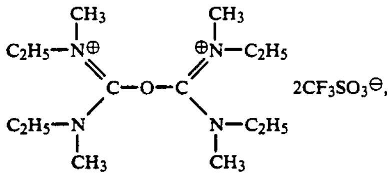
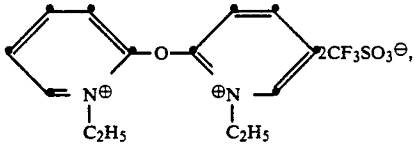
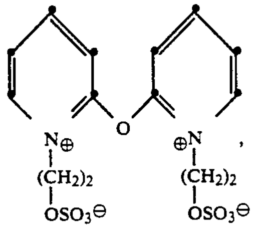
-continued
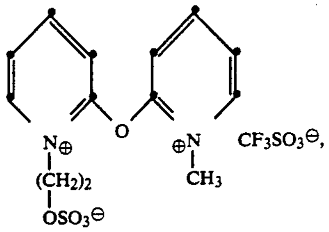
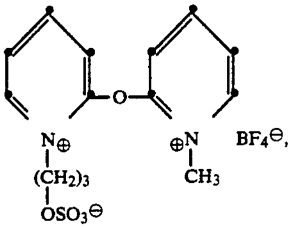
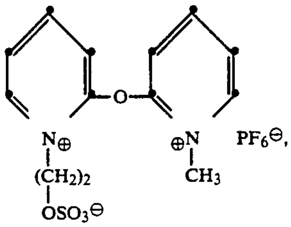
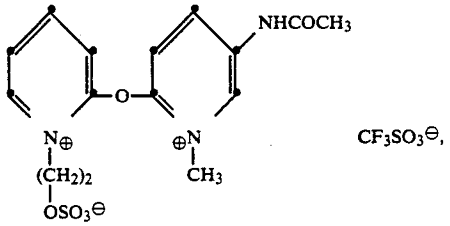
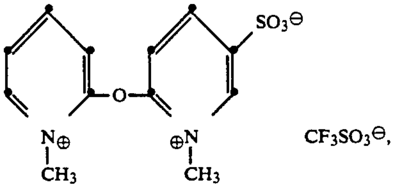
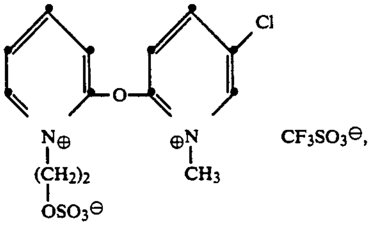
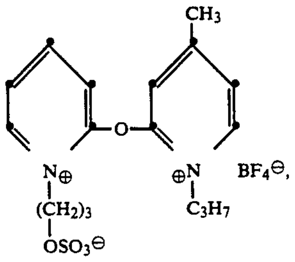

-continued
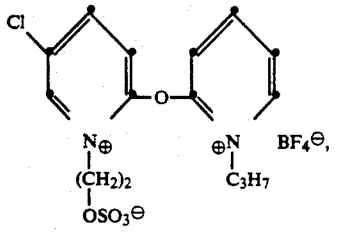
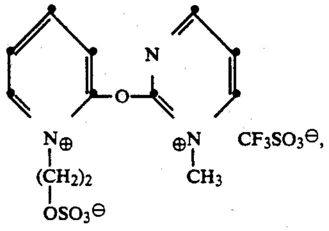
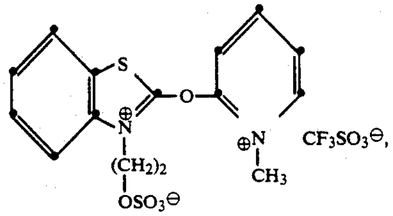
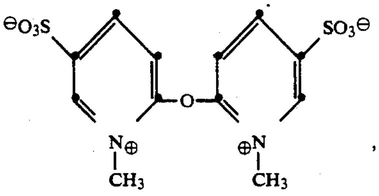
,
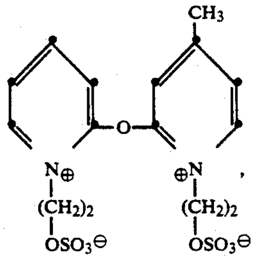
,
-continued
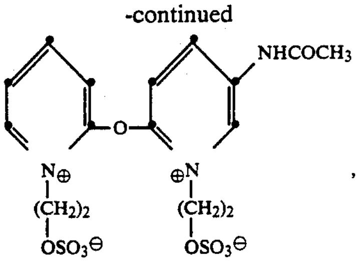
,
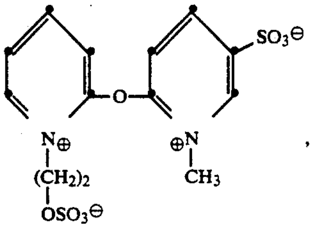
,
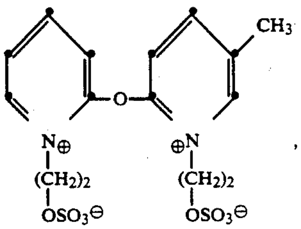
,
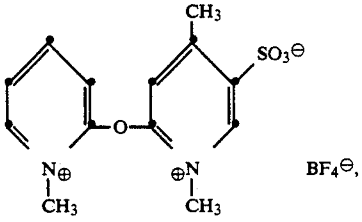
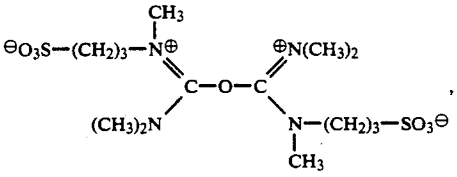
,
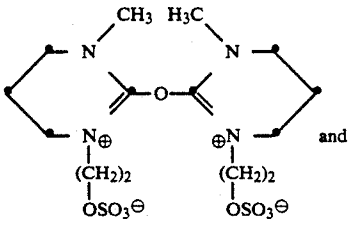
and
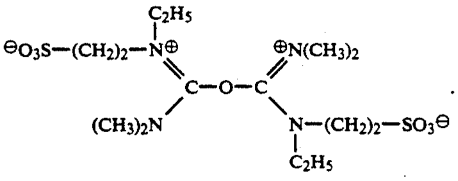
.
* * * * *